United States Patent
Sato et al.

(10) Patent No.: US 11,757,716 B2
(45) Date of Patent: Sep. 12, 2023

(54) NETWORK MANAGEMENT APPARATUS, METHOD, AND PROGRAM

(71) Applicant: NIPPON TELEGRAPH AND TELEPHONE CORPORATION, Tokyo (JP)

(72) Inventors: Masataka Sato, Musashino (JP); Kazuaki Akashi, Musashino (JP); Shingo Horiuchi, Musashino (JP); Kenichi Tayama, Musashino (JP); Kenji Murase, Musashino (JP); Kimihiko Fukami, Musashino (JP); Shohei Nishikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/641,062

(22) PCT Filed: Sep. 12, 2019

(86) PCT No.: PCT/JP2019/035956
§ 371 (c)(1),
(2) Date: Mar. 7, 2022

(87) PCT Pub. No.: WO2021/048982
PCT Pub. Date: Mar. 18, 2021

(65) Prior Publication Data
US 2022/0345364 A1    Oct. 27, 2022

(51) Int. Cl.
*G06F 15/173* (2006.01)
*H04L 41/0816* (2022.01)
*H04L 41/0893* (2022.01)

(52) U.S. Cl.
CPC ...... *H04L 41/0816* (2013.01); *H04L 41/0893* (2013.01)

(58) Field of Classification Search
CPC .......... H04L 41/0816; H04L 41/0893
See application file for complete search history.

(56) References Cited

U.S. PATENT DOCUMENTS

2018/0024866 A1* 1/2018 Yoshimura .............. H04L 41/50
709/226

FOREIGN PATENT DOCUMENTS

JP    2007214971 A    8/2007
JP    201878523 A    5/2018

OTHER PUBLICATIONS

Masataka Sato et al., Study of Variable Management Architecture for Diverse Networks, IEICE Technical Report, vol. 116, No. 324, 2016, pp. 37-42.

* cited by examiner

*Primary Examiner* — Wing F Chan
*Assistant Examiner* — Joseph R Maniwang
(74) *Attorney, Agent, or Firm* — Harness, Dickey & Pierce, P.L.C.

(57) ABSTRACT

There is provided a network management device (1) including a capacity management unit (10) for managing the capacity in a network to be managed and a storage unit (20) for storing management information. The storage unit stores specification information of entities included in the network, and entity information including information indicative of relationships between the entities. The capacity management unit 10 includes a capacity request acquisition section (11) which receives a generation request of a first entity; reads the specification information about the first entity from the storage unit, and determines whether or not the first entity needs to consume a resource; when it is determined that the first entity needs to consume a resource, identifies a second entity capable of providing capacity consumed by the first entity, based on the entity information stored in the storage unit; and outputs information about the identification result.

6 Claims, 24 Drawing Sheets

Fig. 8

| ATTRIBUTE NAME | MEANING | DATA EXAMPLE 1 | | | DATA EXAMPLE 2 | | |
|---|---|---|---|---|---|---|---|
| Name | NAME OF ENTITY | Switch1 – Switch2_FRE_UserA | | | Switch1 – Switch2_FRE_UserB | | |
| RSC | NAME OF ATTRIBUTE FOR WHICH CAPACITY IS REQUESTED | BAND | VLAN-ID | | BAND | VLAN-ID | |
| RCV | VALUE/AMOUNT CORRESPONDING TO CAPACITY ATTRIBUTE NAME | 60 | 1 | | 30 | 2 | |

Fig. 9

| | | MEANING | DATA EXAMPLE | |
|---|---|---|---|---|
| name | | NAME OF ENTITY | Switch1 – Switch2_PL | |
| capacity | | • REPRESENTS CAPACITY WHICH CAN BE PROVIDED, AND RECORD OF CAPACITY PROVIDED TO REQUESTING ENTITY.<br>• ONE ENTITY CAN RETAIN A PLURALITY OF CAPACITY REQUESTS. | | |
| | name | NAME OF CAPACITY TO BE PROVIDED | BAND | VLAN-ID |
| | units | UNIT OF CAPACITY TO BE PROVIDED (IT IS UNNECESSARY IN THE CASE OF LIST OF VALUES. IT IS INDICATED BY [-]) | Mbps | – |
| | capacityAmount | REPRESENTS RANGE OF AMOUNT OR VALUE WHICH CAN BE PROVIDED | 100 | 1–4094 |
| | capacityDemand | REPRESENTS PROVIDED CAPACITY. A PLURALITY OF SETTINGS ARE POSSIBLE. | 30 | 2 |
| | capacityDemandAmount | PROVIDED CAPACITY AMOUNT OR VALUE | 60 | 1 |
| | entityName | DESTINATION ENTITY NAME | Switch1 – Switch2_FRE_UserA | Switch1 – Switch2_FRE_UserB | Switch1 – Switch2_FRE_UserA | Switch1 – Switch2_FRE_UserB |

| | MEANING | DATA EXAMPLE | | | |
|---|---|---|---|---|---|
| name | NAME OF SPEC | FRE_VLAN_Spec | | | |
| RSC | NAME OF ATTRIBUTE WHICH REPRESENTS CHARACTERISTIC OF NETWORK | BAND | | | |
| RSCV | RANGE OF VALUE WHICH ABOVE-MENTIONED ATTRIBUTE CAN TAKE | 1–1000Mbps | | | |
| ConsumeCapacityInfo | REPRESENTS INFORMATION ABOUT CAPACITY CONSUMPTION. | | | | |
| Attribute | NAME OF ATTRIBUTE FOR WHICH CAPACITY IS REQUESTED. IT NEEDS TO BE DEFINED IN RSC. | BAND | | | |
| consumeFuncName | REPRESENTS NAME OF FUNCTION USED FOR CAPACITY PAYOUT. | VOLUME PAYOUT FUNCTION | | | |
| Provider | REPRESENTS IN ARRAY, INFORMATION FOR IDENTIFYING CAPACITY PROVIDING ENTITY. REFERENCE RELATIONSHIP BETWEEN ENTITIES IS FOLLOWED FROM CAPACITY CONSUMING ENTITY IN THE ORDER OF ARRAY, AND END OF ARRAY POINTS TO CAPACITY PROVIDING ENTITY. | 0 | 1 | 2 | 3 |
| ObjectType | REPRESENTS TYPE OF REFERENCED ENTITY. (ONE OF PD, PP, PL, TL, NFD, TPE, FRE (NC), FRE (LC), FRE (XC)) | TPE | TPE | PP | PL |
| ReferDirection | REPRESENTS DIRECTION OF REFERENCE. FORWARD: FORWARD DIRECTION, REVERSE: REVERSE DIRECTION. | Forward | Forward | Forward | Reverse |
| ReferKey | REPRESENTS NAME OF ATTRIBUTE WHICH IS KEY WHEN REFERENCING NEXT ENTITY. | _endPoint | _server TpeRef | _physical Port | _physicalPort |
| ConstrainedKey | REPRESENTS KEY INFORMATION FOR NARROWING DOWN WITH CONSTRAINTS WHEN THERE ARE A PLURALITY OF REFERENCE DESTINATION CANDIDATES. | – | – | – | ResourceSpec |
| ConstrainedValue | REPRESENTS VALUE CORRESPONDING TO ABOVE-MENTIONED KEY. | – | – | – | PL_SW–SW_Spec |

ARRAY FORMAT

Provider:

Index:0
ObjectType:TPE
ReferDirection:Forward
ReferKey:_endPoint

Index:1
ObjectType:TPE
ReferDirection:Forward
ReferKey:_serverTpeRef

Index:2
ObjectType:PP
ReferDirection:Forward
ReferKey:_physicalPort

| LAYER TYPE | ENTITY NAME | | MEANING | NOTATION IN FIGURES |
|---|---|---|---|---|
| PHYSICAL | PD(Physical Device) | | DEVICE | ▭ |
| | PP(Physical Port) | | COMMUNICATION PORT WHICH DEVICE HAS | □ |
| | PL(Physical Link) | | CONNECTION CABLE BETWEEN DEVICES | — |
| LOGICAL | TL(Topological Link) | | CONNECTIVITY BETWEEN DEVICES | ◆—◆ |
| | NFD(Network Fowarding Domain) | | RANGE WHERE TRANSFER IS POSSIBLE IN DEVICE | ⬭ |
| | TPE(Termination Point Encapsulation) | | TERMINATION POINT OF COMMUNICATION | ○ |
| | FRE (Forwarding Relationship Encapsulation) | NC (Network Connection) | END-END CONNECTIVITY FORMED BY LC OR XC BETWEEN TPE | ◆-·-◆ |
| | | LC (Link Connection) | CONNECTIVITY BETWEEN DEVICES TERMINATED BY TPE | ◆-··-◆ |
| | | XC (Cross Connect) | CONNECTIVITY WITHIN DEVICE TERMINATED BY TPE | ◆····◆ |

NETWORK MANAGEMENT APPARATUS, METHOD, AND PROGRAM

CROSS-REFERENCE TO RELATED APPLICATIONS

This application is a 371 U.S. National Phase of International Application No. PCT/JP2019/035956, filed on Sep. 12, 2019. The entire disclosure of the above application is incorporated herein by reference.

TECHNICAL FIELD

An aspect of the present invention relates to a network management device, method and program.

BACKGROUND ART

Network operation business is known which manages network devices constituting a network (NW) and performs setting work for the devices in response to orders from users. In network operation business, a network management system is used to automate complicated setting work for a plurality of network devices. The network management system has a network information management function which retains management information according to the network/device to be managed.

In general, the network management system has a management function specialized for a specific network/device. Therefore, it is necessary to redevelop the network management system every time the model or network method of the network device is changed.

Here, a system architecture has been proposed which does not require redevelopment of a network management system for each network to be managed, when changing the model or communication method of the network device to be managed (for example, see Non-Patent Literature 1).

CITATION LIST

Non-Patent Literature

Non-Patent Literature 1: Masataka Sato and 3 others, "Tayouna NW he tekiyoukanouna NW kanri aakitekutya no kentou (in Japanese)" (Study of Variable Management Architecture for Diverse Networks), IEICE technical report 116 (324), 37-42, Nov. 24, 2016

SUMMARY OF THE INVENTION

Technical Problem

In the above-described network operation business, settings are usually made for the network device so that communication based on the user's request is possible. But it is not possible to set beyond the resources such as the communication band which can be provided by the network device. Therefore, it is necessary to manage the capacity of the resources which can be provided by the network device and make settings for the device while determining whether it can be allocated to the user.

The system architecture described in above-mentioned Non-Patent Literature 1 uses a mechanism that enables general-purpose data retention which does not depend on the network to be managed, and generates a plurality of network management information (entities) including setting values and setting amounts for the device. But in the prior art, it must be determined by a human operator in generating entities whether such setting values or setting amounts can actually be set for the device. Further, the capacity management of the resource of the device, and the like also need to be performed by other means.

An object of the present invention, which has been made in consideration of the above-mentioned circumstances, is to provide a technique capable of automatically managing resources included in a network to be managed, in a network management system, to reduce work of operators.

Means for Solving the Problem

In order to attain the object, a first aspect of the present invention is a network management device including a storage unit and a capacity management unit, wherein the storage unit includes a first storage unit which stores specification information indicative of specifications of a plurality of entities included in a network to be managed, and a second storage unit which stores entity information including information indicative of relationships between the plurality of entities, and the capacity management unit is configured to receive an entity generation request for requesting generation of a first entity with respect to the network; read the specification information about the first entity from the first storage unit, and determine whether or not the first entity has a consumption specification attribute indicating that a resource in the network needs to be consumed; when it is determined that the first entity has the consumption specification attribute, identify a second entity capable of providing capacity of a resource consumed by the first entity, based on the entity information stored in the second storage unit; and output information about the identified second entity.

Effects of the Invention

According to the above-mentioned first aspect, in the network management device, the specification information and the entity information are stored, and when the network management device receives the generation request of the first entity for the network to be managed, it is determined whether or not the first entity needs to consume resources, based on the stored specification information. Then, when it is determined that the first entity needs to consume resources, the network management device identifies based on the stored entity information, the second entity which can provide the capacity of resources consumed by the first entity, and outputs the information of the second entity.

In this way, the network management device manages the capacity of the resources in the network together with the information of the entity which consumes the resources and the entity which can provide the resources, without requiring work of operators.

That is, according to the above-mentioned network management device, a technique can be provided which makes it possible to automatically manage resources in the target network to reduce work of operators.

BRIEF DESCRIPTION OF DRAWINGS

FIG. 8 is a diagram showing an example of the definition of attributes of a capacity consuming entity in the network management device shown in FIG. 1.

FIG. 9 is a diagram showing an example of the definition of attributes of a capacity providing entity in the network management device shown in FIG. 1.

FIG. 12 is a diagram showing an example of the definition of the specification shown in FIG. 11.

FIG. 22 is a diagram showing an example of an entity managed by the network management device shown in FIG. 1.

DESCRIPTION OF EMBODIMENTS

Hereinafter, embodiments according to the present invention is described with reference to the drawings.

An Embodiment (1) Configuration (1-1) Functional Configuration

A network management device according to an embodiment manages a network (NW) including a plurality of network devices, automatically allocates resources which satisfy a request from a user, and for example, is composed of a server computer managed by a telecommunications carrier.

Figure 1:
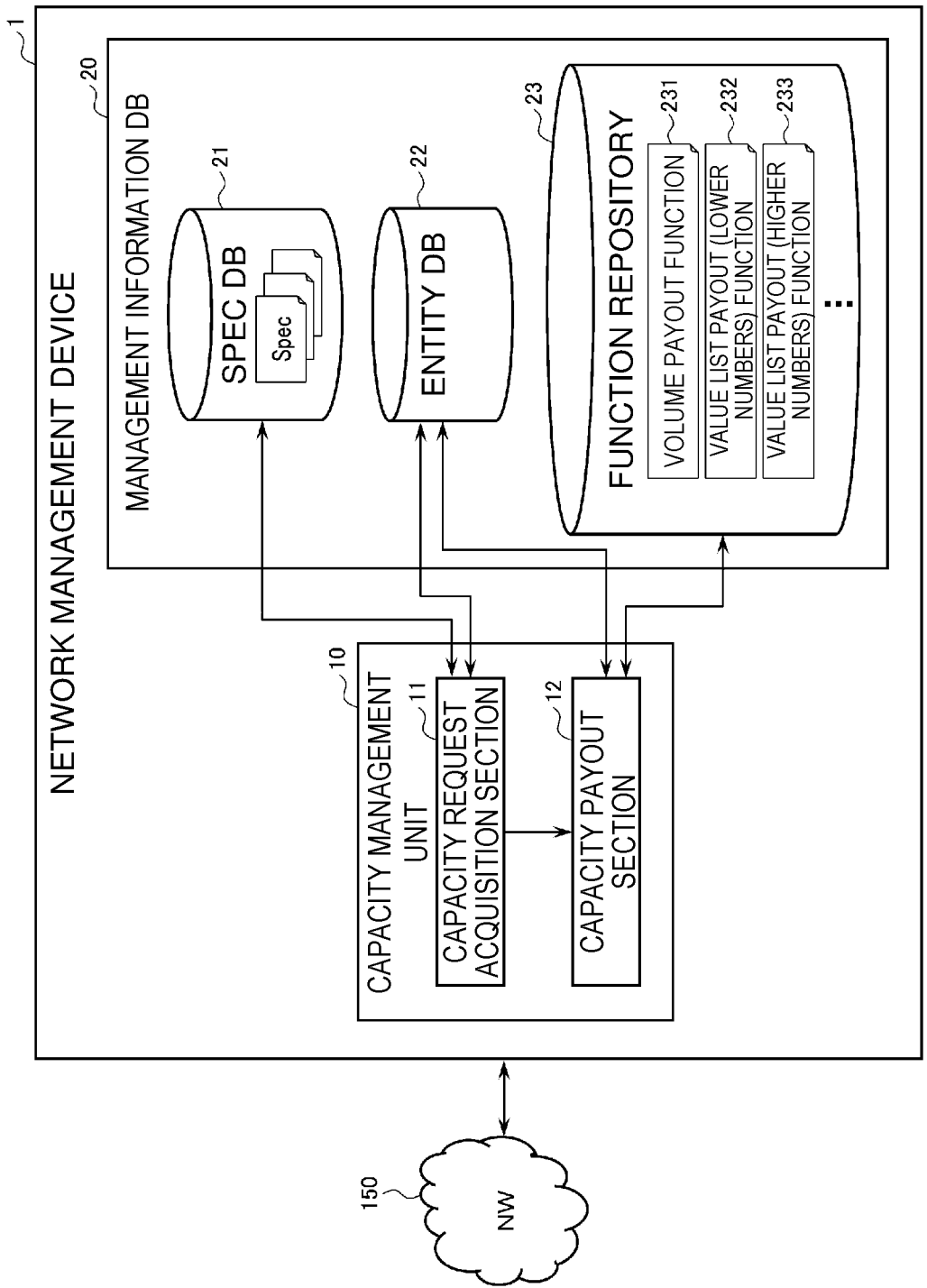
FIG. 1 is a block diagram showing a functional configuration of a network management device according to an embodiment of the present invention.

FIG. 1 shows a functional configuration of such a network management device 1.

The network management device 1 can communicate via a network (NW) 150 with a plurality of network devices constituting the network 150. The network 150 is used for providing network services, for example, and is composed of an IP (Internet Protocol) network represented by the Internet and a plurality of access networks for accessing the IP network. As the access network, for example, a wireless LAN (Local Area Network), a mobile phone network, a wired telephone network, FTTH (Fiber To The Home), and a CATV (Cable Television) network are used. Hereinafter, the network management device 1 and the network 150 to be managed are also collectively referred to as "a network management system".

The network management device 1 shown in FIG. 1 includes a capacity management unit 10 as a processing function unit implemented by software, and includes a management information database (DB) 20 in addition to a program storage unit, as storage areas necessary for realizing this embodiment.

The capacity management unit 10 has a function to manage the resource capacity of the network devices included in the network to be managed, determine whether the user's request can be satisfied with respect to the resource capacity, and pay out necessary resources when it is determined that the user's request can be satisfied. The capacity management unit 10 includes a capacity request acquisition section 11 and a capacity payout section 12.

The capacity request acquisition section 11, as a request acquisition section, performs processing to receive input from the operator based on the user's request, acquire information necessary for paying out the capacity corresponding to the user's request, generate a payout request, and pass it to the capacity payout section 12.

The capacity payout section 12 performs processing to receive the capacity payout request from the capacity request acquisition section 11 and pay out the capacity.

Here, the network management device 1 according to an embodiment adopts a network management architecture having a mechanism for externally defining the attributes which the network management information (Entity) has, according to the specification which defines the characteristics of the network. Each information is stored in the management information DB 20.

The management information DB 20 stores various information for managing the network 150, and includes a Spec DB 21 as a first storage unit, an Entity DB 22 as a second storage unit, and a function repository 23 as a third storage unit.

The Spec DB 21 stores specification information which defines the characteristics of the network. The specification information includes the specification about an entity which is management information of the network.

The Entity DB 22 stores attribute information about an entity (Entity) which is network management information. The attribute information includes information indicative of the relationship between entities and the characteristics (such as VLAN) of each network which the entities have.

The function repository 23 stores various functions used to pay out the capacity. In FIG. 1, as an example of functions stored in the function repository 23, a volume payout function 231, a value list payout (lower numbers) function 232, and a value list payout (higher numbers) function 233 are shown, but the example is not limited to them.

FIG. 22 shows an example of entities managed by the network management device 1 based on the above-mentioned network management architecture. The entities are roughly divided into physical layer entities and logical layer entities. In the example shown in FIG. 22, as the physical layer entities, PD (Physical Device, device), PP (Physical Port, a communication port which the device has), and PL (Physical Link, a connection cable between devices) are defined. In the example shown in FIG. 22, as the logical layer entities, TL (Topological Link, connectivity between devices), NFD (Network Forwarding Domain, a range where transfer is possible in the device), TPE (Termination Point Encapsulation, termination point of communication), FRE (Forwarding Relationship Encapsulation), NC (Network Connection, End-End connectivity formed by LC or XC between TPE), LC (Link Connect, connectivity between devices terminated by TPE), XC (Cross Connect, connectivity within the device terminated by TPE) are also defined. Each of these entities is also distinguished in the notation in the figures, as illustrated in FIG. 22.

Figure 23:
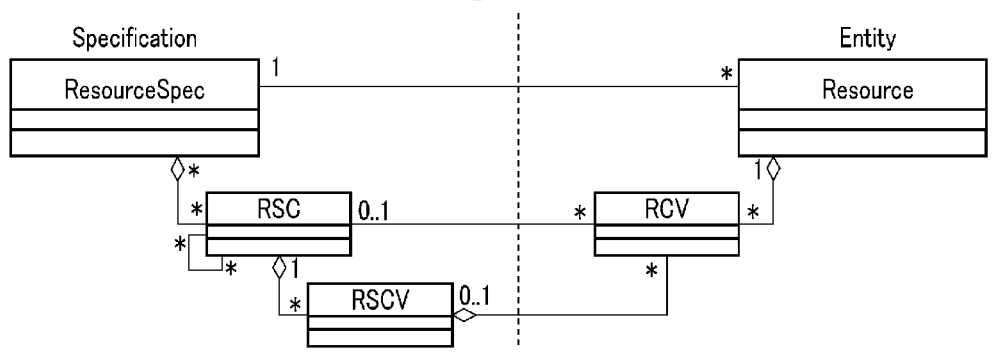
FIG. 23 is a diagram showing the relationship between a specification and an entity used in the network management device shown in FIG. 1.

FIG. 23 shows a class diagram representing the relationship between the Specification and the Entity. In this architecture, entities are collectively called a resource, and a specification of a resource is called ResourceSpecification (ResourceSpec). ResourceSpec has ResourceSpecCaracteristic (RSC) and ResourceSpecCaracteristicValue (RSCV), and a characteristic of each network is defined by a pair of RSC and RSCV. RSC indicates a name of an attribute which is a characteristic, and RSCV indicates values which RSC can take. The resource entity retains with ResourceCharacteristicValue (RCV) the value for the RSC attribute of ResourceSpec which is the basis of the entity.

Figure 24:
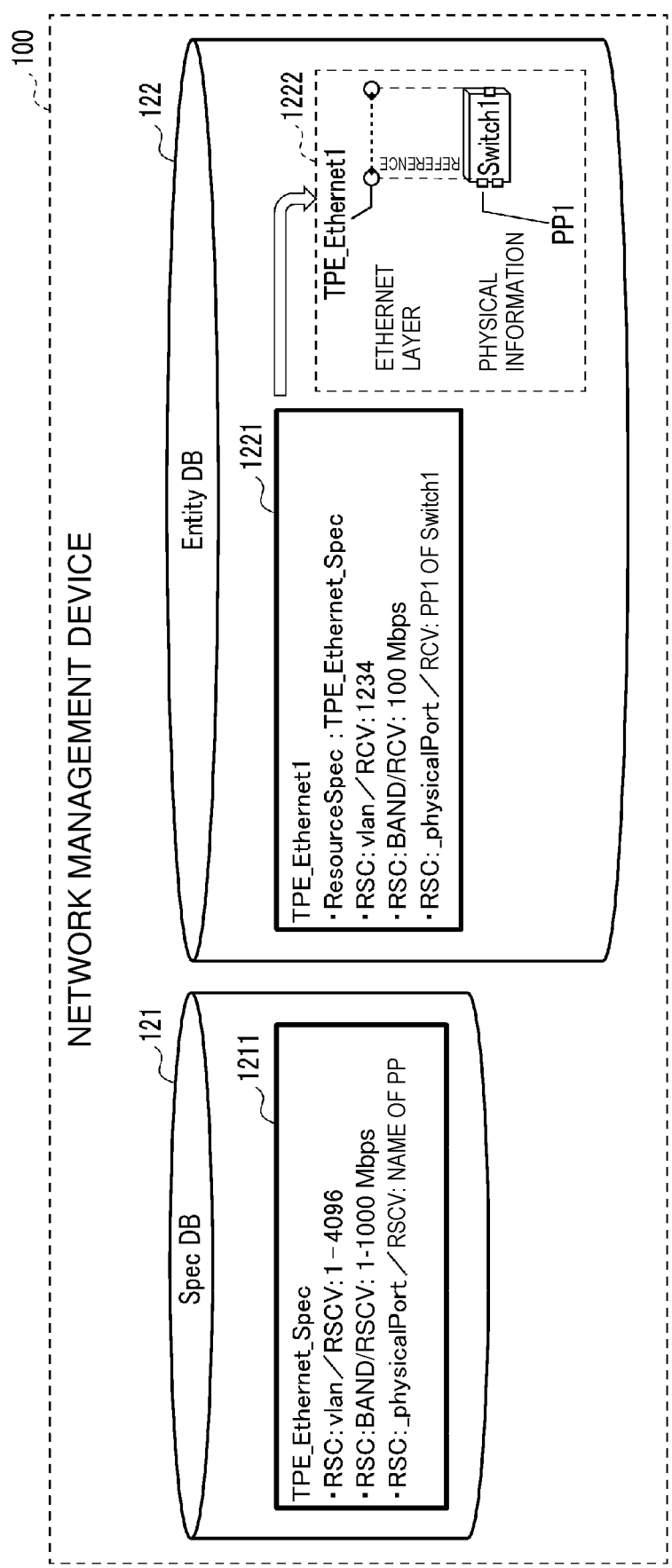
FIG. 24 is a diagram showing a data example of specifications and entities used in the network management device shown in FIG. 1.

FIG. 24 shows an example of specifications and entities of TPE (Termination Point Encapsulation) of the Ethernet® layer. As described above, the specifications are stored in the Spec DB 21 of the network management device 1, and the entities are stored in the Entity DB 22 of the network management device 1.

The specification "TPE_Ethernet_Spec" shown as 1211 in FIG. 24 defines three RSCs (vlan, band, _physicalPort) and the values which each RSC can take, as RSCV. According to the specification 1211, "vlan" can take values of "1-4096", "band" can take values of "1-1000 Mbps", and "physicalPort" retains "the name of PP".

The entity "TPE_Ethernet1" shown as 1221 in FIG. 24 indicates that it is an entity created from the specification "TPE_Ethernet_Spec", by the ResourceSpec attribute. In this example, the entity 1221 retains specific values (vlan: 1234, band: 100 Mbps, _physicalPort: PP1 of Switch1) with RCV for each of the three RSC attributes defined in the corresponding specification 1211.

What is shown by 1222 in FIG. 24 is a diagrammatic representation of the entity stored in the Entity DB 22. According to 1222, the TPE_Ethernet1 entity of the Ethernet layer has a reference relationship to the PP1 entity of Switch1 of the physical layer. This represents that the TPE_Ethernet1 entity shown in 1221 retains the name of the PP1 entity of Switch1 in the _physicalPort attribute. In the following, entities are described by means of such diagrams.

Figure 25:
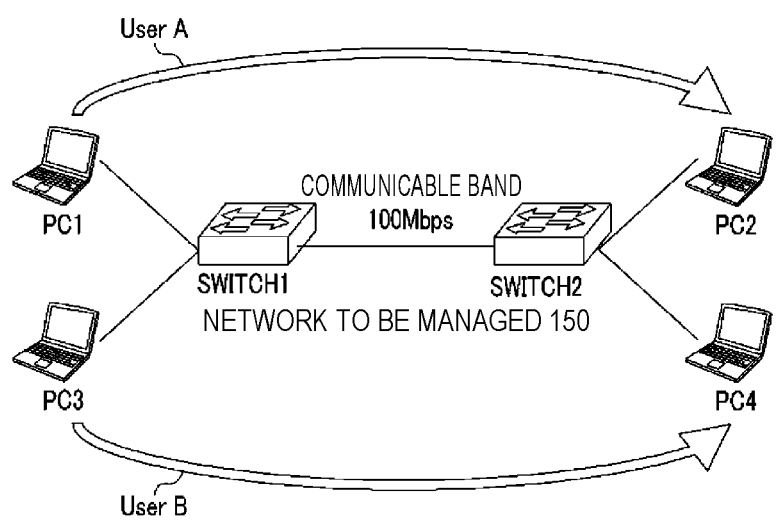
FIG. 25 is a diagram showing an outline of requests from users which the network management device shown in FIG. 1 can receive.

FIG. 25 shows an outline of requests of users which can be received by the network management device 1 according to an embodiment. In FIG. 25, it is assumed that the network 150 to be managed by the network management device 1 is composed of two Ethernet switches (Switch 1 and Switch 2), and the cable between the switches has a communicable band of 100 Mbps.

As shown in FIG. 25, it is assumed that a request that the user A (User A) wants to communicate from the PC1 to the PC2, and a request that the user B (User B) wants to communicate from the PC3 to the PC4 have come to the network 150. In the prior art, the operator who manages the network 150 needs to determine whether or not the communicable band which the cable has is exceeded. As an example, if the request of the user A is a request to communicate from the PC1 to the PC2 in a band of 80 Mbps, and the request of the user B is a request to communicate from the PC3 to the PC4 in a band of 50 Mbps, the operator performs the operations (Q1) to (Q4) as described below.

(Q1) The operator first determines whether the request of the user A can be satisfied. In the example of FIG. 25, the used band is still 0 Mbps at this point with respect to the communicable band 100 Mbps between the switches. Since the request of the user A is 80 Mbps, the following equation is satisfied, and the operator determines that the request of the user A can be satisfied (OK).

The communicable band 100 Mbps>the used band 0 Mbps+the requested band 80 Mbps (Q2) Next, the operator generates network management information (entity) based on the request of the user A, in the network management system.

(Q3) The operator updates the resource management information based on the generated entity. That is, 80 Mbps is registered as the used band with respect to the communicable band 100 Mbps.

(Q4) Subsequently, the operator determines whether the request of the user B can be satisfied. In a situation where the used band 80 Mbps is registered with respect to the communicable band 100 Mbps according to step Q3, 50 Mbps is requested by the user B. Therefore, according to the following equation, the operator determines that the request of the user B cannot be satisfied (NG).

The communicable band 100 Mbps<the used band 80 Mbps+the requested band 50 Mbps

As such, in the prior art, the operator selects a route which satisfies the user's application, and generates a group of entities. It is necessary for the operator to determine whether the capacity of the device or network is sufficient for the application from the user.

In contrast, the network management device 1 according to an embodiment includes the capacity management unit 10, receives a "logical entity generation instruction" from the operator, performs a capacity payout process with respect to the instructed logical entity, and generates the entity. That is, in the network management device 1 (or the network management system including the network management device 1), the following procedure is performed instead of the above-mentioned (Q1) to (Q4).

(T1) The network management device 1 receives an instruction to generate network management information (entity) based on the requests of the users A/B.

(T2) The network management device 1 determines whether the request of the user A can be satisfied.

(T3) The network management device 1 generates an entity and updates the resource management information.

(T4) The network management device 1 determines whether the request of the user B can be satisfied.

As such, according to the network management device 1, the operator's work described in the above-mentioned procedures (Q1) to (Q4) becomes unnecessary. In particular, in the network management device 1, it is not necessary for the operator to determine whether it is within the capacity of the network.

Therefore, the network management device 1 according to an embodiment can automatically manage the resource capacity of the network device and allocate the necessary resources, in the network management system using the architecture which does not depend on the network to be managed.

(1-2) Hardware Configuration

Figure 2:
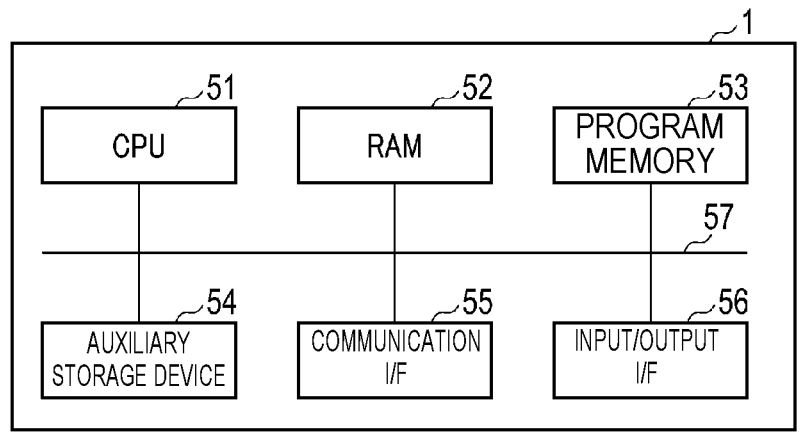
FIG. 2 is a block diagram showing a hardware configuration of a network management device according to an embodiment of the present invention.

FIG. 2 shows an example of a hardware configuration of the network management device 1 as mentioned above.

The network management device 1 includes, as hardware, a CPU (Central Processing Unit) 51, a RAM (Random Access Memory) 52, a program memory 53, an auxiliary storage device 54, a communication interface (I/F) 55, an input/output interface (I/F) 56 and a bus 57. The CPU 51 communicates with the RAM 52, the program memory 53, the auxiliary storage device 54, the communication interface 55, and the input/output interface 56 via the bus 57.

The CPU 51 is an example of a general-purpose hardware processor.

The RAM 52 is used as a working memory by the CPU 51. The RAM 52 includes a volatile memory such as an SDRAM (Synchronous Dynamic Random Access Memory).

The program memory 53 stores a program (including computer-executable instructions) necessary for executing various control processes according to an embodiment. As the program memory 53, for example, a ROM (Read-Only Memory), a part of the auxiliary storage device 54, or a combination thereof is used.

All of the processing functions described with respect to the capacity management unit 10 of the network management device 1 are realized by causing the CPU 51 to execute the application program stored in the program memory 53. For example, the program (computer executable instruction) related to the capacity request acquisition process, when executed by the CPU 51, causes the CPU 51 to execute a series of processes described with respect to the capacity request acquisition section 11.

The auxiliary storage device 54 non-temporarily stores data. The auxiliary storage device 54 includes a non-volatile memory such as a hard disk drive (HDD) or a solid state drive (SSD). The auxiliary storage device 54 can store various data including the network management information described with respect to the above-mentioned management information DB 20.

The communication interface 55 is an interface for communicating with an external communication device. The communication interface 55 includes, for example, a wired LAN terminal, and is connected to a network including the Internet by a LAN cable.

The input/output interface 56 includes a plurality of terminals for connecting an input device and an output device. Examples of the input device include a keyboard, a mouse, a microphone and the like. Examples of the output device include a display device, speakers and the like.

The program may be provided to the network management device 1 in a state of being stored in a computer-readable storage medium. In this case, for example, the network management device 1 further includes a drive (not shown) for reading data from the storage medium, and acquires the program from the storage medium. Examples of the storage medium include a magnetic disk, an optical disk (a CD-ROM, a CD-R, a DVD-ROM, a DVD-R and the like), a magneto-optical disk (an MO and the like), and a semiconductor memory. And also, the program may be stored in a server on the network, and the network management device 1 may download the program from the server using the communication interface 55.

The processing described in the embodiment is not limited to being performed by a general-purpose processor such as the CPU 51 executing a program, and may be performed by a dedicated processor such as an ASIC (Application Specific Integrated Circuit).

The network management device 1 is not limited to being implemented by one computer (network management device). The network management device 1 may be implemented by a plurality of computers. For example, the network management device 1 may be composed of a computer which functions as the capacity request acquisition section 11 and a computer which functions as the capacity payout section 12.

(2) Operation

Next, the information processing operation by the network management device 1 configured as described above is described.

(2-1) Outline of Operation

First, an outline of the operation of the network management device 1 is described with reference to FIGS. 3 and 4.

(2-1-1) Advance Preparation

Figure 3:
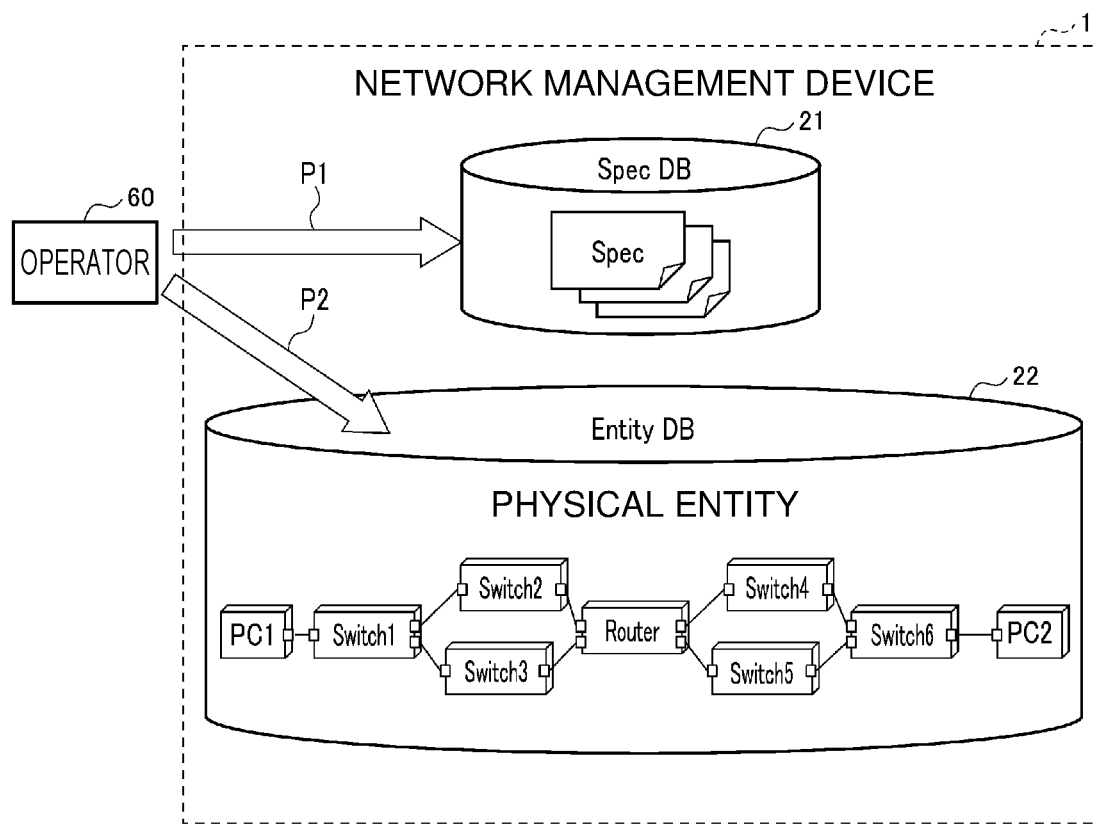
FIG. 3 is a diagram showing a procedure of advance preparation in the network management device shown in FIG. 1.

FIG. 3 shows the procedure of advance preparation in the network management device 1.

In step P1 in advance, the network management device 1 receives an operation of an operator 60, and registers the specification which defines the network 150, with the Spec DB 21.

In step P2, the network management device 1 also receives an operation of the operator 60, and generates an entity of the physical layer (a physical entity) with respect to the Entity DB 22.

(2-1-2) Operation of the Capacity Management Unit

Figure 4:
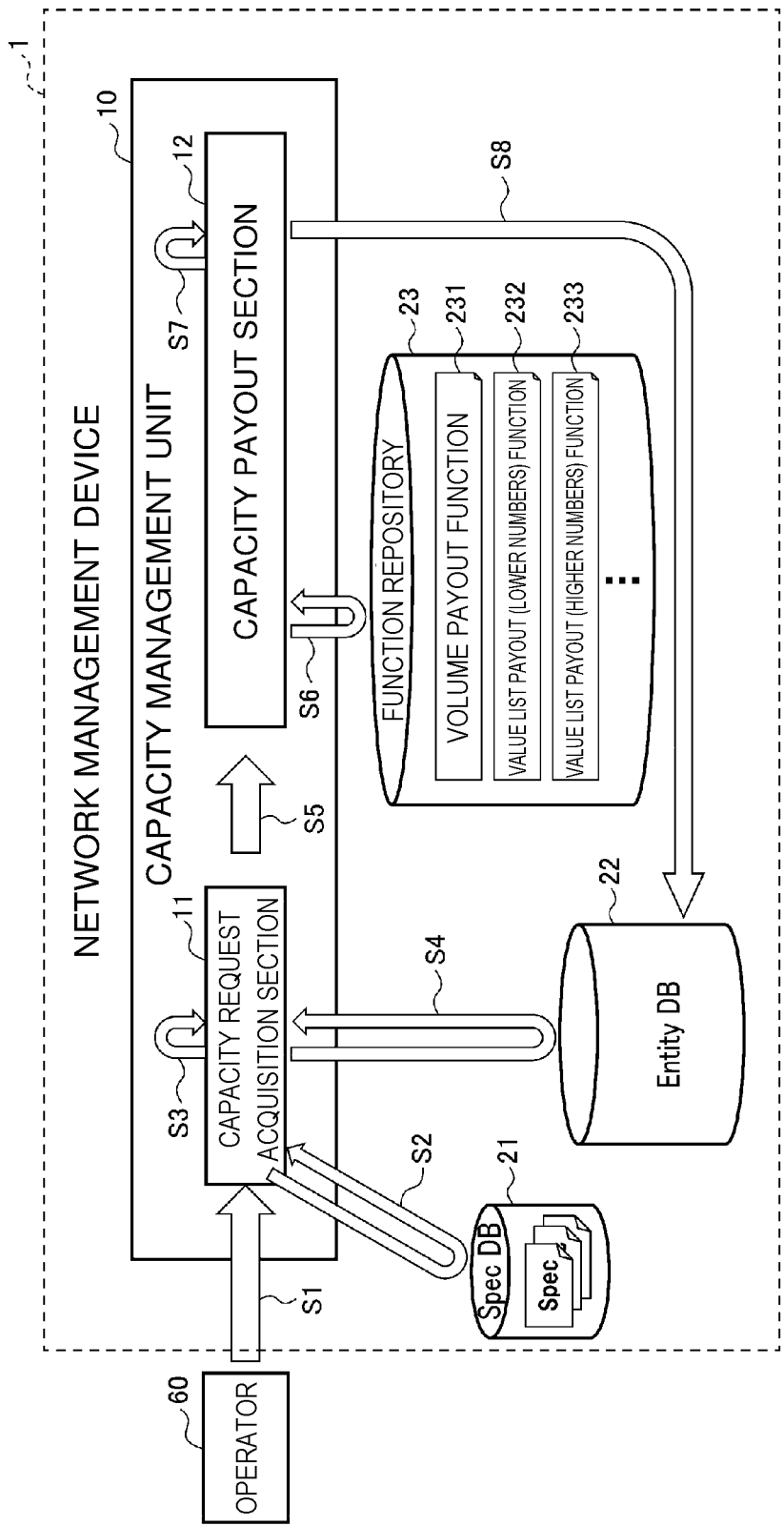
FIG. 4 is a diagram showing a procedure of capacity management among processes by the network management device shown in FIG. 1.

FIG. 4 shows an outline of the operation of the capacity management unit in the network management device 1.

(S1) Receipt of Request of Capacity

First, in step S1, the network management device 1 receives by the capacity management unit 10 the logical entity desired to be generated (the capacity consuming entity) and the generation request thereof which were input by the operator 60 based on the user's application, and passes them to the capacity request acquisition section 11.

Here, among the entities retained by the network management device 1, an entity that retains the capacity which the device has, such as the communication band is called a "capacity providing entity", and a logical entity generated for each user with respect to the capacity providing entity is called a "capacity consuming entity".

Figure 5:
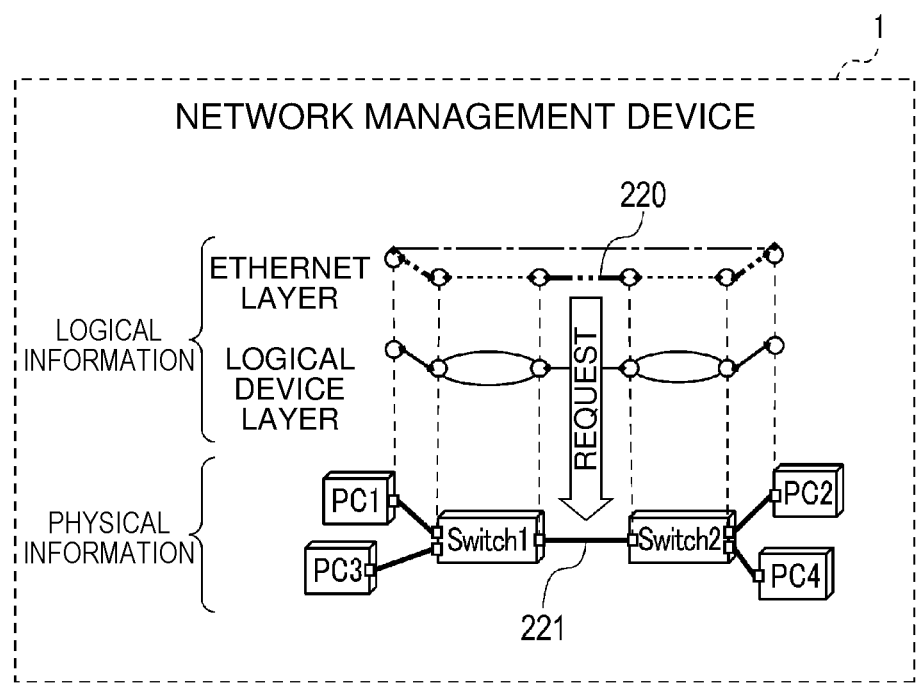
FIG. 5 is a diagram showing an outline of capacity request in the network management device shown in FIG. 1.

FIG. 5 is a diagram showing an outline of such entities and capacity request/provision.

As shown in FIG. 5, in the network management device 1, the capacity is requested from a logical entity (capacity consuming entity) 220 to a capacity providing entity 221 based on the user's request.

Here, the type of capacity includes "volume" and an "identifier". The "volume" is represented by, for example, a quantity such as the band (e.g., 100 Mbps), the memory (e.g., 8 GB), and the CPU (e.g., 8 cores), and is the type where the capacity providing entity side uses a part of the amount retained by itself. The "identifier" is represented by, for example, an identifier such as a VLAN-ID (e.g., 1, 2, 3, . . . ) and an MPLS label (e.g., 20, 21, . . . ), and is the type where the capacity providing entity has a list of available identifiers and uses one identifier in that list.

Figure 6:
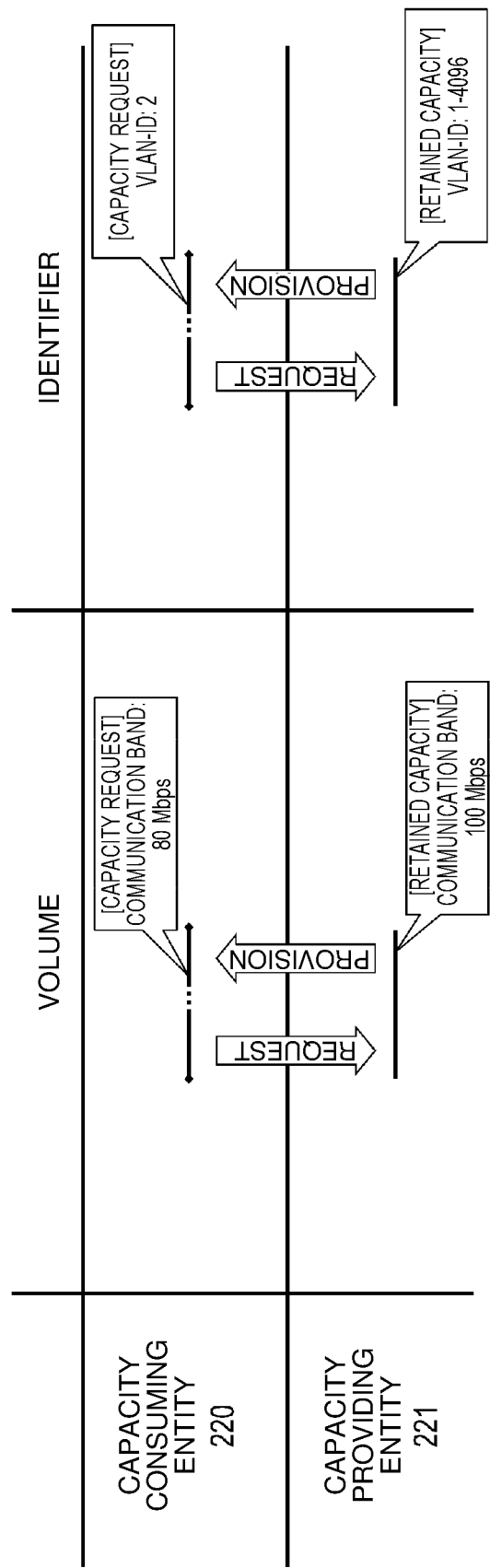
FIG. 6 is a diagram showing an outline of request and retention of capacity in the network management device shown in FIG. 1.

FIG. 6 shows an example of request and retention of capacity with respect to such "volume" and "identifier". With respect to the volume, in the example of FIG. 6, the capacity consuming entity 220 requests 80 Mbps out of the communication band of 100 Mbps retained by the capacity providing entity 221. And also, with respect to the identifier, in the example of FIG. 6, the capacity consuming entity 220 requests the VLAN-ID 2 out of the available VLAN-IDs 1-4096 retained by the capacity providing entity 221.

(S2) Acquisition of the Specification

Then, in step S2 of FIG. 4, the capacity request acquisition section 11 acquires the specification (Spec) of the input capacity consuming entity from the Spec DB 21.

(S3) Determination of the Presence or Absence of a Consumption Specification Attribute In step S3, the capacity request acquisition section 11 determines whether or not the acquired specification has the capacity consumption specification attribute (consumeCapacityInfo). If the acquired specification does not have the capacity consumption specification attribute, the above-mentioned logical entity is an entity which does not need to secure the capacity of the device resource. In that case, the capacity request acquisition section 11 registers the logical entity in the Entity DB 22 and ends the process. If the acquired specification has the capacity consumption specification attribute, the process proceeds to the following processing.

(S4) Acquisition of the Capacity Providing Entity

In step S4, the capacity request acquisition section 11 accesses the Entity DB 22 and acquires a capacity providing entity (an entity which retains the capacity to be managed and provides the capacity for requests) based on the acquired consumeCapacityInfo.

(S5) Payout Request

In step S5, the capacity request acquisition section 11 generates a payout request and requests the capacity payout section 12 to pay out the capacity. The payout request includes information which identifies the capacity providing entity, a payout function used for the payout, and information which identifies the requested amount or the requested value.

(S6) Acquisition of the Payout Function

In step S6, the capacity payout section 12 acquires the capacity payout function necessary for the payout from the function repository 23, based on the payout request received from the capacity request acquisition section 11.

(S7) Payout of Capacity

In step S7, the network management device 1 pays out the capacity by the capacity payout section 12 using the acquired payout function. If the payout result (the requested amount/the requested value) is NG (the request cannot be satisfied), the capacity payout section 12 cancels the process.

(S8) Registration of Capacity

Finally, in step S8, based on the payout result in step S7, the network management device 1 registers the capacity consuming entity and also registers information of the paid-out capacity with the capacity providing entity.

(2-1-3) Request/Allocation of Capacity

Figure 7:
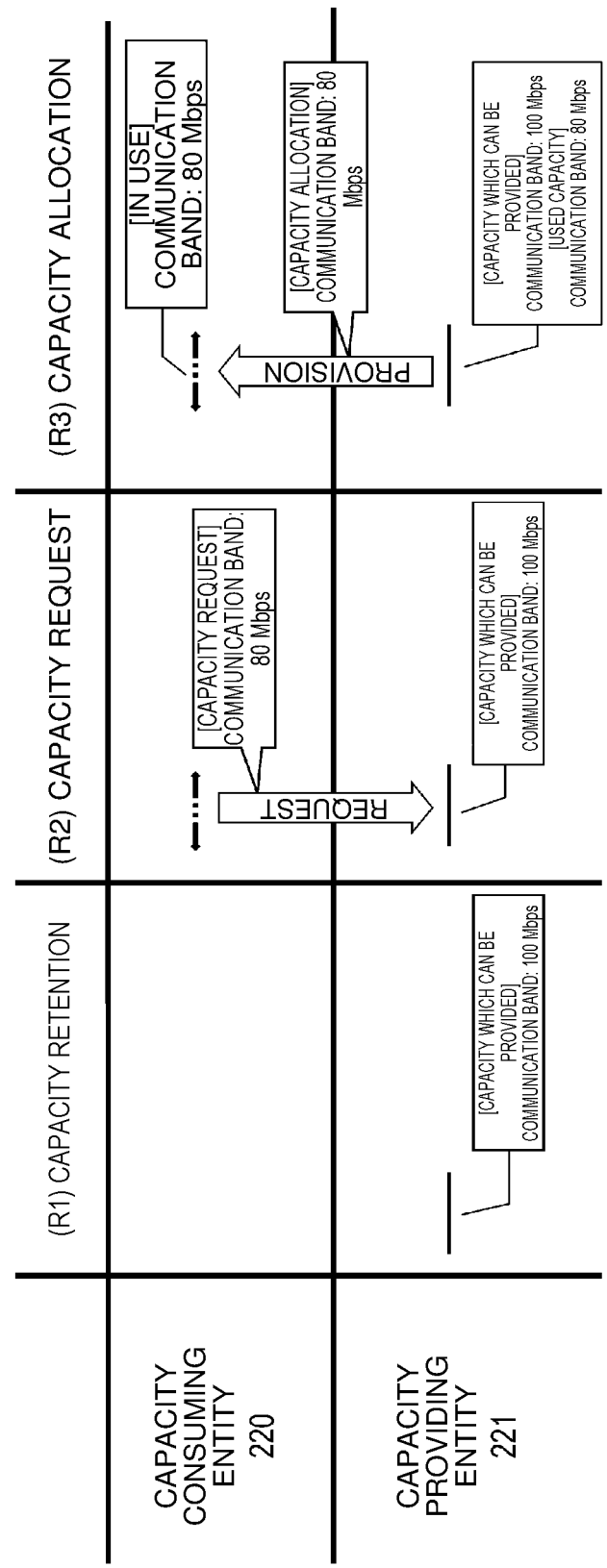
FIG. 7 is a diagram showing an outline of the flow of capacity allocation process in the network management device shown in FIG. 1.

FIG. 7 is a diagram showing an outline of processing from request of capacity to allocation of capacity.

In the network management device 1 according to an embodiment, the following processes (R1) to (R3) are executed.

(R1) The network management device 1 causes the capacity providing entity 221 to retain capacity which can be provided (a communication band 100 Mbps in this example), in advance.

(R2) The capacity consuming entity 220 requests capacity (a communication band 80 Mbps in this example) from the capacity providing entity 221.

(R3) The capacity payout section 12 determines that allocation is possible (OK) when the following equation holds.

Capacity which can be provided—used capacity—requested capacity>0

If allocation is possible, the capacity payout section 12, as shown in the figure, updates the used capacity of the capacity providing entity 221 (to 80 Mbps in this example) and allocates (provides) the requested capacity (80 Mbps in this example) to the requesting logical entity.

Here, the network management device 1 further defines capacity-related attributes for the entity in the above-mentioned network management architecture in order to express request and provision of capacity.

FIG. 8 shows the definition of attributes of the capacity consuming entity as an example of such capacity-related attributes.

As shown in FIG. 8, in the capacity consuming entity 220, "Name (the name of the entity)", "RSC (the name of the attribute for which capacity is requested)", and "RCV (the value/amount corresponding to the capacity attribute name)" are defined. As described above, the capacity consuming entity 220 retains the requested amount of capacity with a pair of RSC/RCV. This RSC/RCV is not only the requested amount, but also plays the role of retaining the paid-out capacity. It is assumed that the unit of the numerical value retained in RCV is the same as the unit on the capacity providing entity 221 side. As shown in the figure, it is possible for one entity to retain a plurality of capacity requests. Data examples are described later.

FIG. 9 shows the definition of attributes of the capacity providing entity as another example of the above-mentioned capacity-related attributes.

As shown in FIG. 9, as the attributes of the capacity providing entity 221, "name (the name of the entity)" and "capacity (the capacity which can be provided, and the record of the capacity provided to the requesting entity)" are defined. As shown in the figure, it is possible for one entity to retain a plurality of capacity requests.

The "capacity" attribute has, as child elements, "name (the name of capacity to be provided)", "units (the unit of capacity to be provided (it is indicated by [-] because it is unnecessary in the case of a list of values))", "CapacityAmount (the range of the amount/value of capacity which can be provided)", and "CapacityDemand (the record of provided capacity) (a plurality of settings are possible)". The "CapacityDemand" further has a "CapacityDemandAmount (the amount/value of provided capacity)" and an "entityName (the destination entity name)". Data examples are also described later.

(2-1-4) Retention of Capacity

Figure 10:
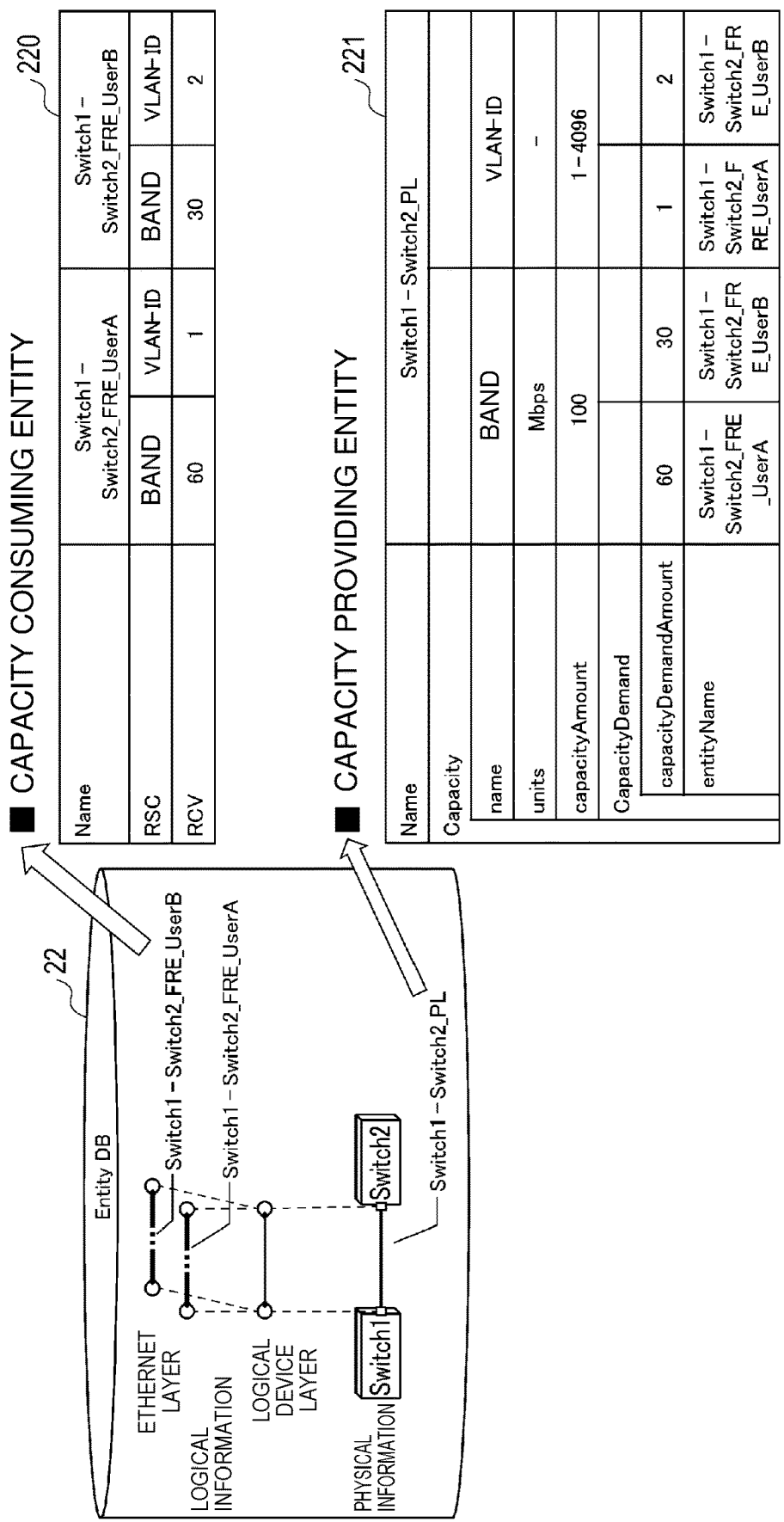
FIG. 10 is a diagram showing an example of retention of capacity in the network management device shown in FIG. 1.

FIG. 10 shows an outline of retention of capacity using the data examples shown in FIGS. 8 and 9. In FIG. 10, in the Entity DB 22, the connection relationship of the logical layer (Ethernet layer and Logical Device layer), the connection relationship of the physical layer (including Switch1 and Switch2), and the reference relationship between the logical layer and the physical layer are retained.

As data examples of the capacity consuming entity 220, there are shown Name "Switch1-Switch2_FRE_UserA" which is the capacity request for the user A, and Name "Switch1-Switch2_FRE_UserB" which is the capacity request for the user B. In FIG. 10, "Switch1-Switch2_FRE_UserA" requests band=60, VLAN-ID=1, and "Switch1-Switch2_FRE_UserB" requests band=30, VLAN-ID=2.

As a data example of the capacity providing entity 221, there is shown Name "Switch1-Switch2_PL" which has a reference relationship with respect to the capacity request about the user A and the user B mentioned above. In accordance with the Capacity attribute of "Switch1-Switch2_PL" shown in FIG. 10, the band which can be provided is 100 Mbps according to "name=band, units=Mbps, CapacityAmount=100", and the VLAN-ID which can be provided is [1-4096] according to "name=VLAN-ID, CapacityAmount=1-4096".

Further, as to "band", in accordance with the CapacityDemand attribute of the capacity providing entity 221, it is shown that there is a record that the band "60 Mbps" has been provided to the entity "Switch1-Switch2_FRE_UserA" according to "CapacityDemandAmount=60, entityName=Switch1-Switch2_FRE_UserA", and the band "30 Mbps" has been provided to the entity "Switch1-Switch2_FRE_UserB" according to "CapacityDemandAmount=30, entityName=Switch1-Switch2_FRE_UserB".

Similarly, as to "VLAN-ID", in accordance with the CapacityDemand attribute of the capacity providing entity 221, it is shown that there is a record that the VLAN-ID "1" has been provided to the entity "Switch1-Switch2_FRE_UserA" according to "CapacityDemandAmount=1, entityName=Switch1-Switch2_FRE_UserA", and the VLAN-ID "2" has been provided to the entity "Switch1-Switch2_FRE_UserB" according to "CapacityDemandAmount=2, entityName=Switch1-Switch2_FRE_UserB".

Further, the specification (Spec) which is the basis of the capacity consuming entity has a capacity consumption specification attribute (consumeCapacityInfo) which indicates how the capacity is consumed.

Figure 11:
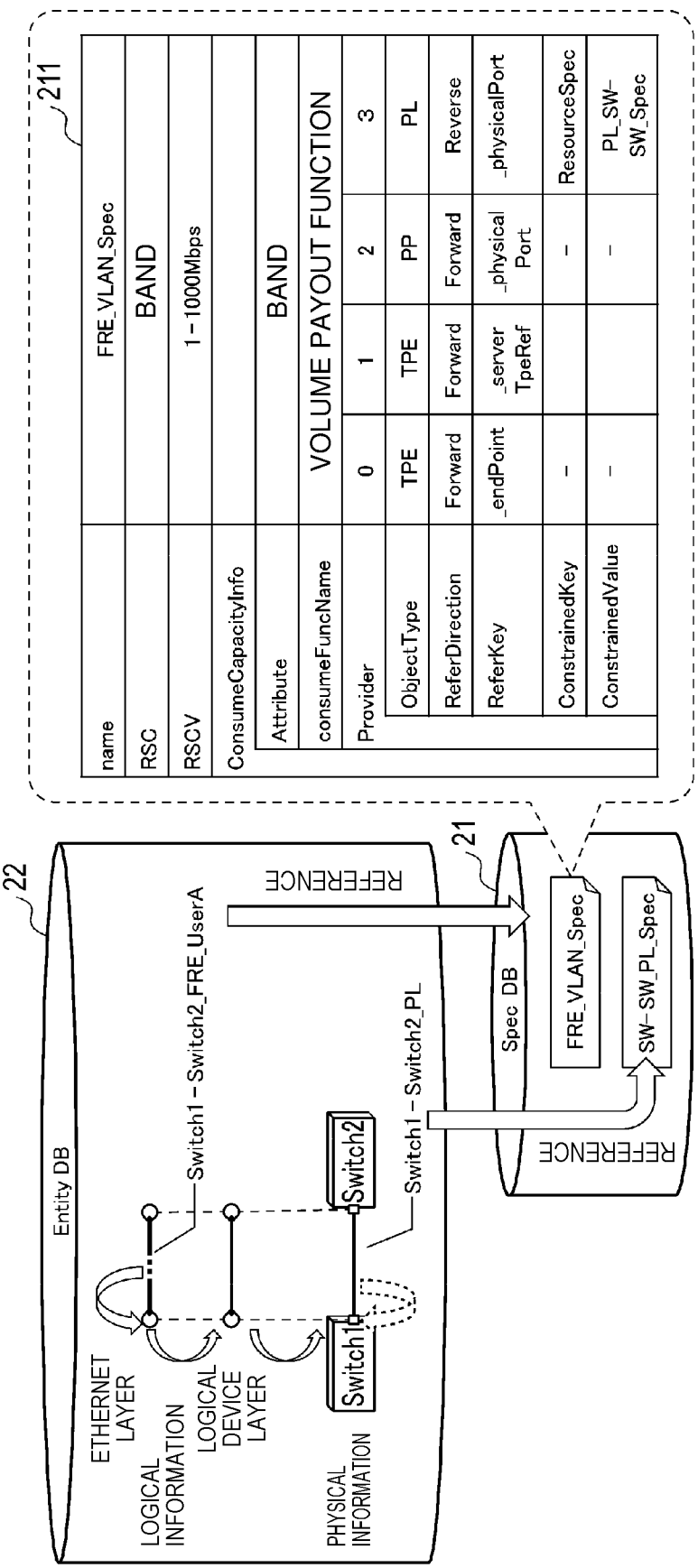
FIG. 11 is a diagram showing an example of a specification of a capacity consuming entity in the network management device shown in FIG. 1.

FIG. 11 shows an example of a specification of such a capacity consuming entity.

As shown in FIG. 11, the specification 211 of the capacity consuming entity "Switch1-Switch2_FRE_UserA" defined by the Entity DB 22 is acquired by referring to the Spec DB 21 and is defined as the name "FRE_VLAN_Spec" in FIG. 11. Such a specification 211 is, for example, appropriately designed by the operator 60 in response to a request from the user, and is stored in response to the operation of the operator 60 in the course of the above-mentioned advance preparation. The attributes shown in FIG. 11 are further described with reference to FIG. 12.

FIG. 12 shows the definition of the capacity consumption specification attribute (consumeCapacityInfo) together with the data example 211 shown in FIG. 11.

The capacity consumption specification attribute includes "name (the name of Spec)", "RSC (the name of the attribute which represents the characteristic of the network)", "RSCV (the range of the value which the above-mentioned attribute can take)", and "ConsumeCapacityInfo (the information about capacity consumption)". "ConsumeCapacityInfo" includes, as child elements, "Attribute (the name of the attribute for which capacity is requested) (which needs to be defined in RSC)", "consumeFuncName (the name of the function used for capacity payout)", and "Provider (the information for identifying the capacity providing entity)". The Provider attribute surrounded by a broken line in FIG. 12 is actually represented in an array format. If the reference relationship between the entities is followed from the capacity consuming entity in the order of the array of the Provider attribute, the end of the array will point to the capacity providing entity. The method of searching for this capacity providing entity is described later.

The above-mentioned Provider attribute further includes "ObjectType (the type of the referenced entity (one of PD, PP, PL, TL, NFD, TPE, FRE (NC), FRE (LC), FRE (XC)))", "ReferDirection (the direction of reference, Forward: forward direction, Reverse: reverse direction)", "ReferKey (the name of the attribute which is the key when referencing the next entity)", "ConstrainedKey (the key information for narrowing down with constraints when there are a plurality of reference destination candidates)" and "ConstrainedValue (the value corresponding to the above-mentioned key)".

(2-1-5) Searching for the Capacity Providing Entity

Figure 13:
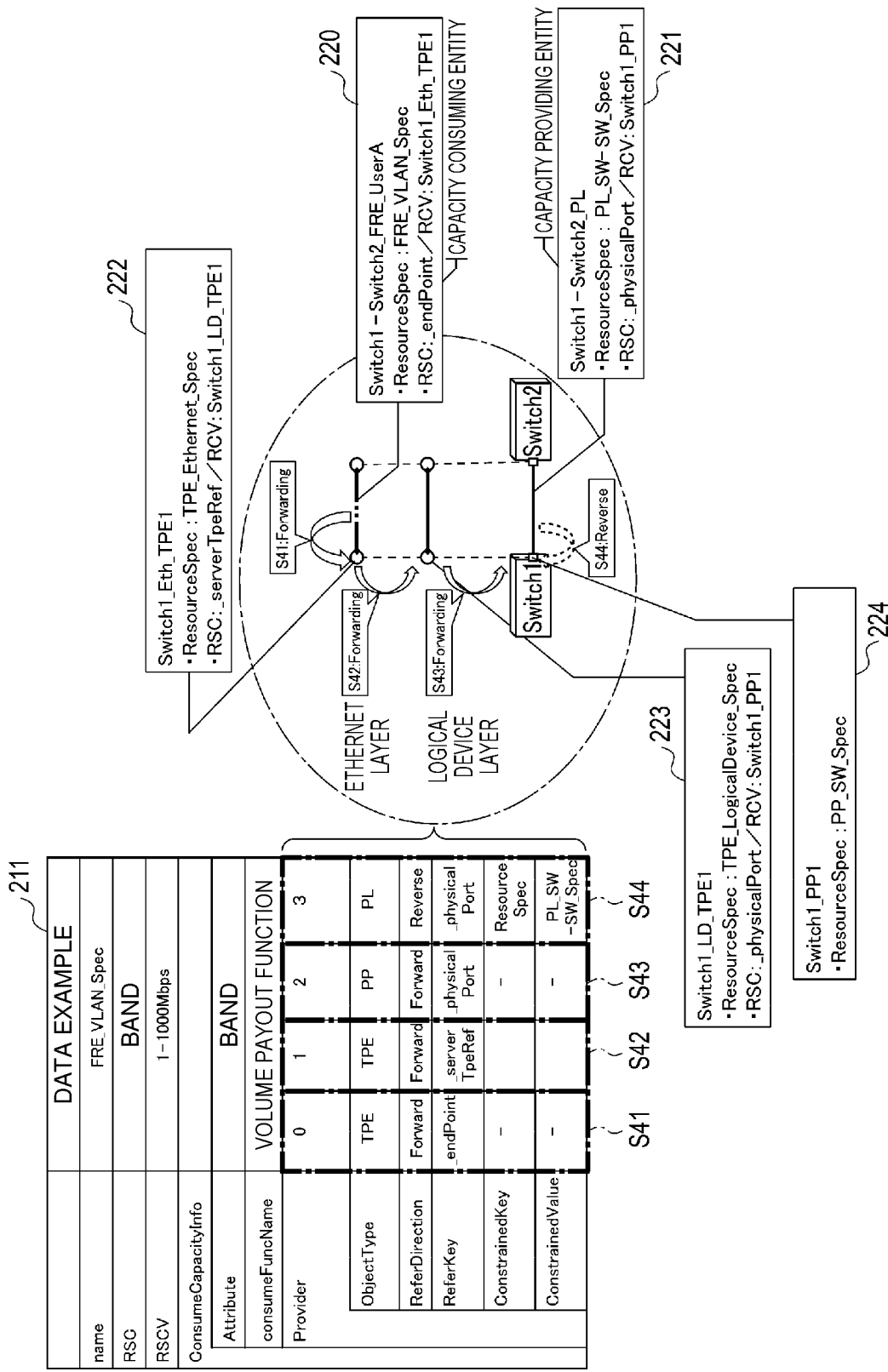
FIG. 13 is a diagram showing the flow of searching for a capacity providing entity based on the specification shown in FIG. 11.

FIG. 13 shows an outline of a method of searching for the capacity providing entity 221 based on the above-mentioned Provider attribute. The data example 211 of the capacity consumption specification shown in FIG. 13 is the same as the specification 211 shown in FIGS. 11 and 12.

In the network management device 1 according to an embodiment, searching for the capacity providing entity 221 is performed by the capacity request acquisition section 11. The capacity request acquisition section 11 searches in either Forwarding (forward direction) or Reverse (reverse direction) for an entity which is in a reference relationship when viewed from the capacity consuming entity 220. This is performed by searching through the array of the Provider attribute in the order from 0 to the end. The reference relationship is represented by RSC/RCV which each entity has. When there are a plurality of search candidates, it is possible to search while narrowing down the target entities by the combination of ConstrainedKey/Value for each reference relationship. Finally, the capacity request acquisition section 11 searches to the end of the array and identifies the entity acquired for the last reference relationship of the array as the capacity providing entity 221.

This search process is further described with the example in FIG. 13.

First, in step S41, the capacity request acquisition section 11 searches for TPE ("Switch1_Eth_TPE1" 222 in this example) referred to by RSC "endPoint" which the FRE entity has. This step is a Forwarding (forward direction) search.

Then, in step S42, the capacity request acquisition section 11 searches for TPE ("Switch1_LD_TPE1" 223 in this example) referred to by RSC "_serverTpeRef" which the searched TPE entity has. This step is a Forwarding (forward direction) search.

In step S43, the capacity request acquisition section 11 searches for PP ("Switch1_PP1" 224 in this example) referred to by RSC "_physicalPort" which the searched TPE entity has. This step is a Forwarding (forward direction) search.

In step S44, the capacity request acquisition section 11 searches for a PL ("Switch1-Switch2_PL" 221 in this example) which refers to the searched PP entity by RSC "physicalPort". This step is a Reverse (reverse direction) search. Here, when a plurality of candidates exist, the capacity request acquisition section 11 selects one which satisfies the combination of ConstrainedKey/Value (ResourceSpec=PL_SW-SW_Spec).

The entity 221 finally acquired by the search process as mentioned above becomes the capacity providing entity.

(2-1-6) Payout of Capacity/Registration of Result

Figure 14:
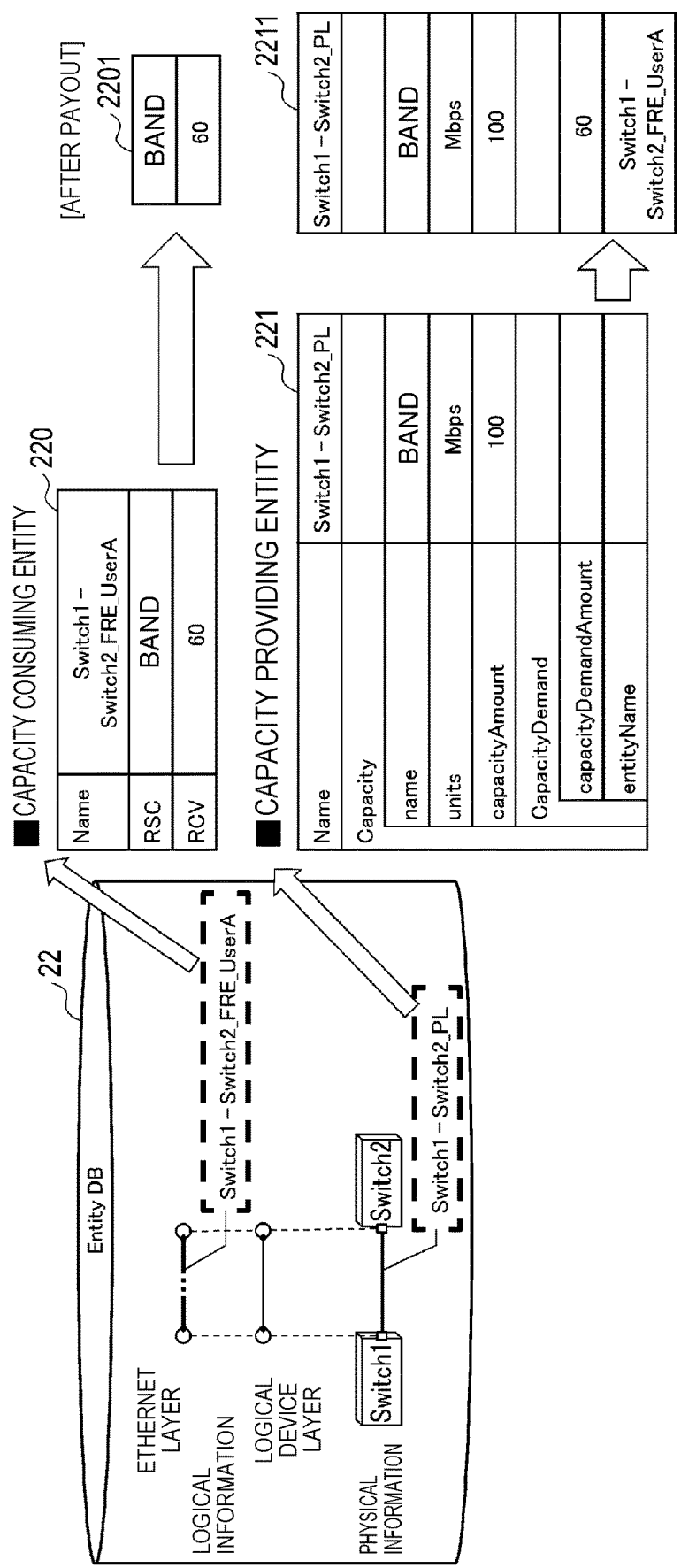
FIG. 14 is a diagram showing a first example of capacity payout in the network management device shown in FIG. 1.
Figure 15:
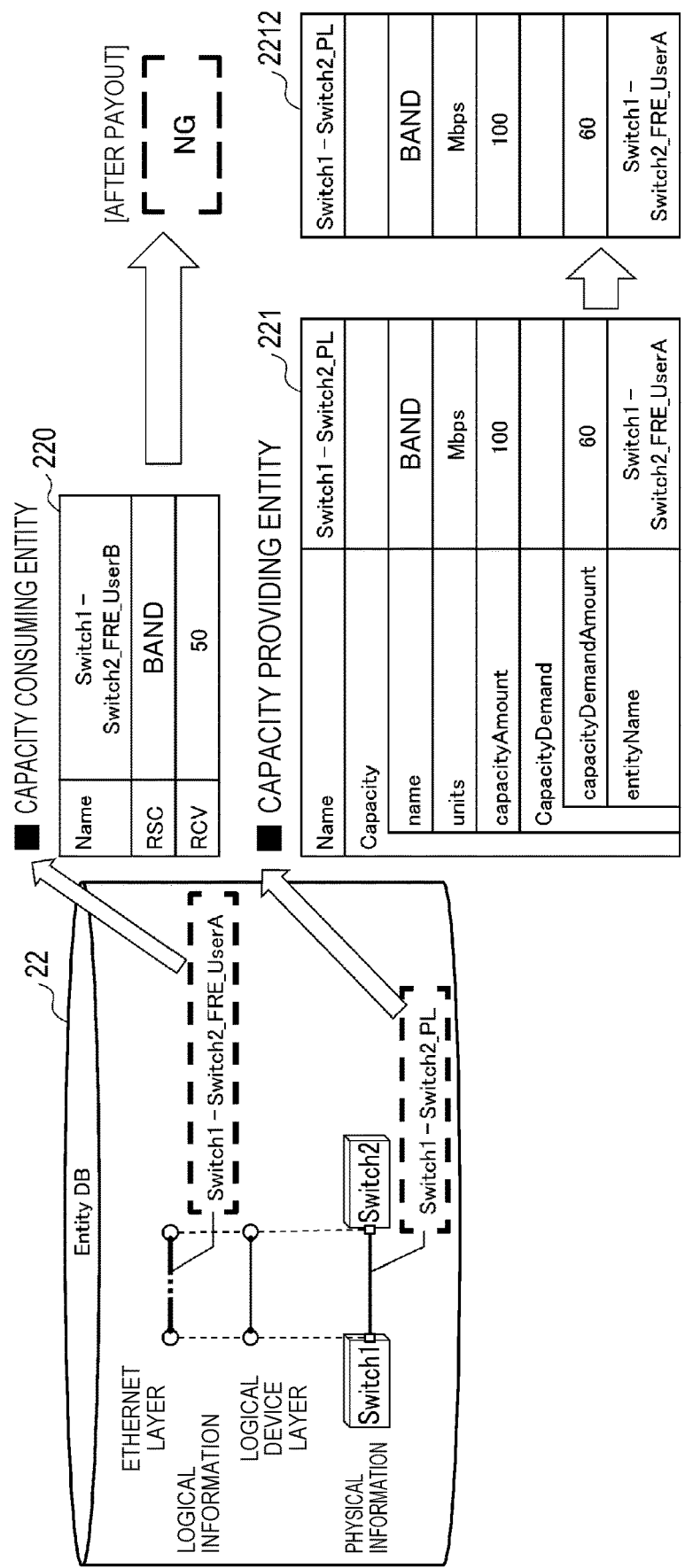
FIG. 15 is a diagram showing a second example of capacity payout in the network management device shown in FIG. 1.
Figure 16:
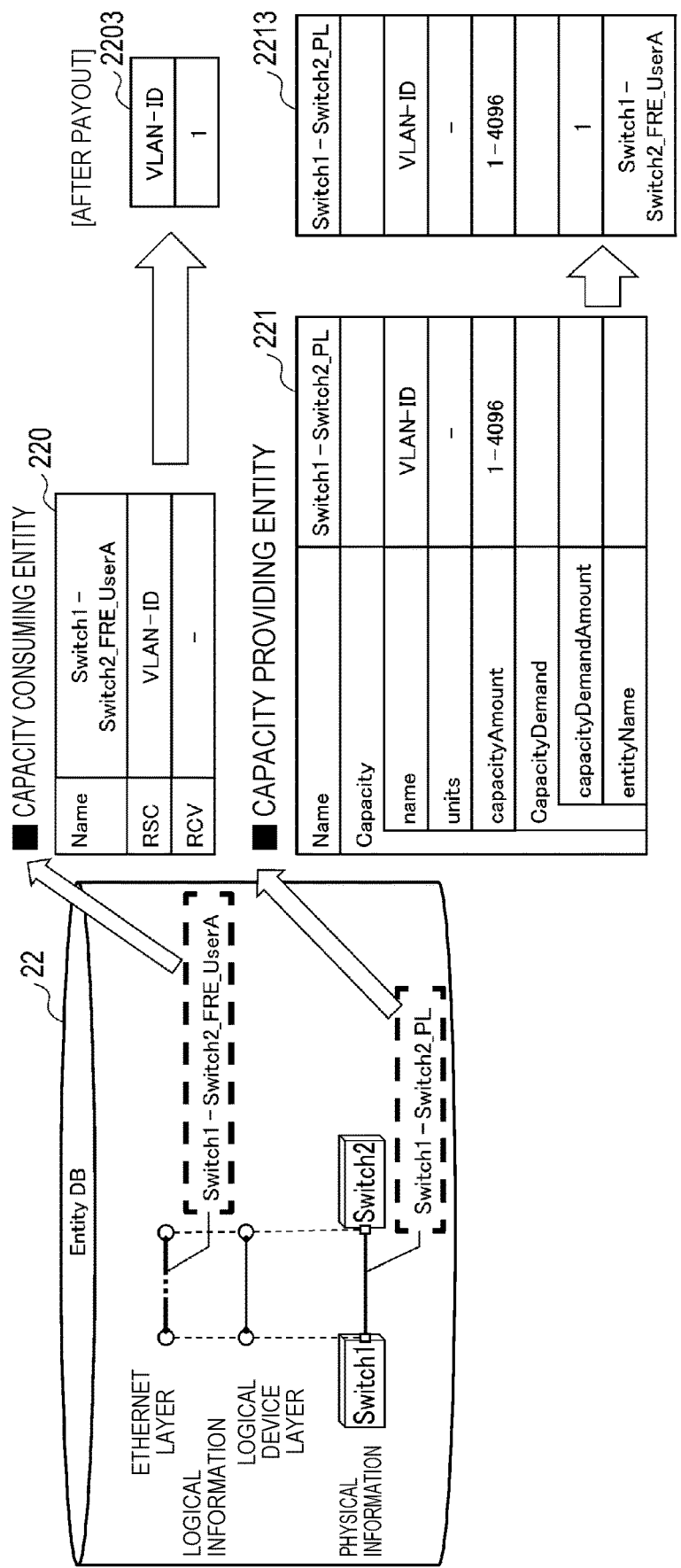
FIG. 16 is a diagram showing a third example of capacity payout in the network management device shown in FIG. 1.

Next, with reference to FIGS. 14 to 16, the payout of capacity and the registration of the payout result are described with three examples ("success of payout of volume", "failure of payout of volume", and "payout of a list of values").

(i) Payout of Volume: Success

FIG. 14 shows an example where payout of capacity is "successful".

It is assumed that the capacity payout section 12 receives the following payout request.

Operation type: payout
Capacity providing entity: Switch1-Switch2_PL
Name of the capacity payout function: volume payout function
Requested amount/requested value: band/60

In this example, the capacity "band" retained by the capacity providing entity 221 has the total amount (CapacityAmount) of 100 Mbps and has not yet been paid out to any entity (no value is registered in CapacityDemand). Therefore, the capacity payout section 12 determines that payout is possible with respect to the requested amount 60, and executes the payout of the requested amount 60. The capacity payout section 12 determines the requested amount of the capacity consuming entity 220 which is the requesting source (2201), and additionally records the requested amount (60) which was paid out and the destination entity (Switch1-Switch2_FRE_UserA) in the provided capacity (CapacityDemand) of the capacity providing entity 221 (2211).

(ii) Payout of Volume: Failure

FIG. 15 shows an example where payout of capacity is "failure (NG)".

It is assumed that the capacity payout section 12 receives the following payout request.

Operation type: payout
Capacity providing entity: Switch1-Switch2_PL
Name of the capacity payout function: volume payout function
Requested amount/requested value: band/50

In this example, the capacity "band" retained by the capacity providing entity 221 has the total amount (CapacityAmount) of 100 Mbps and 60 Mbps have already been paid out (it is registered in Capacity Demand that 60 have been allocated to Switch1-Switch2_FRE_UserA). Therefore, the capacity payout section 12 determines that payout is not possible with respect to the requested amount of 50 this time, and the payout result is NG (failure). Accordingly, the capacity payout section 12 does not update the capacity providing entity 221 (2212).

(iii) Payout of the Identifier: The List of Values

FIG. 16 shows an example where payout of the capacity is a "list of values".

It is assumed that the capacity payout section 12 receives the following payout request.

Operation type: payout
Capacity providing entity: Switch1-Switch2_PL
Name of the capacity payout function: value list payout (lower numbers) function
Requested amount/requested value: VLAN-ID/-

In this example, the capacity "VLAN-ID" retained by the capacity providing entity 221 has the total amount (CapacityAmount) of 1-4096 and has not yet been paid out to any entity (no value is registered in CapacityDemand). Therefore, the capacity payout section 12 determines that payout is possible with respect to the new payout request. Since the function specified this time is the "value list payout (lower numbers) function", the capacity payout section 12 acquires a value from the lower numbers and pays out "1" as the smallest number. The capacity payout section 12 determines RCV (1) of the VLAN-ID as a request of the capacity consuming entity 220 which is the requesting source (2203), and additionally records the request (1) which was paid out and the destination entity (Switch1-Switch2_FRE_UserA) in the provided capacity (CapacityDemand) of the capacity providing entity 221 (2213).

(2-2) Processing Flow

Next, an outline of the operation by the network management device 1 as mentioned above is described again using the processing flow.

Figure 17:
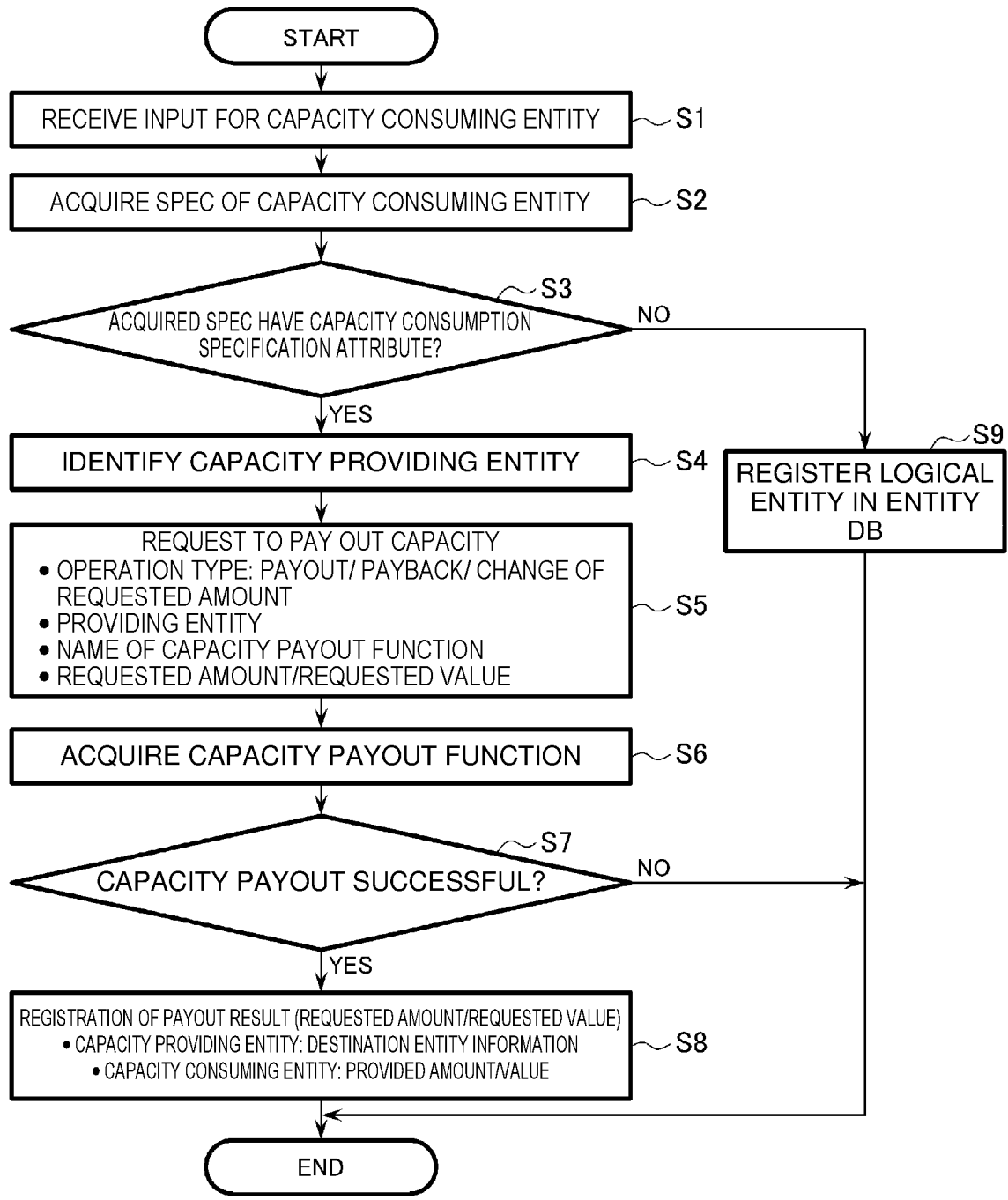
FIG. 17 is a flowchart showing a processing procedure and processing contents by the network management device shown in FIG. 1.

FIG. 17 is a flowchart showing a processing procedure and processing contents thereof. Steps S1 to S8 in FIG. 17 correspond to steps S1 to S8 shown in FIG. 4. It is assumed that the advance preparation steps P1 to P2 described with respect to FIG. 3 have been executed in advance.

The network management device 1 monitors by the capacity management unit 10 the presence or absence of an input from the operator 60, and starts the following processing when receiving the input from the operator 60.

In step S1, the network management device 1 receives by the capacity request acquisition section 11 a request for a capacity consuming entity as a logical entity desired to be generated, from the operator 60.

Then, in step S2, the network management device 1 acquires by the capacity request acquisition section 11 the specification (Spec) of the input capacity consuming entity from the Spec DB 21.

In step S3, the network management device 1 determines by the capacity request acquisition section 11 whether or not the specification acquired from the Spec DB 21 has the capacity consumption specification attribute (consumeCapacityInfo). As a result of this determination, when it is determined that the acquired specification does not have the capacity consumption specification attribute (NO), since it is an entity which does not need to secure the capacity of the device resource, the network management device 1 moves to step S9. In step S9, the network management device 1 registers the logical entity in the Entity DB 22 and ends the process. On the other hand, in step S3, if it is determined that the acquired Spec has the capacity consumption specification attribute (YES), the process proceeds to step S4.

In step S4, the network management device 1 searches by the capacity request acquisition section 11 the reference relationships between the entities using the acquired consumeCapacityInfo, and identifies the capacity providing entity.

In step S5, the network management device 1 generates by the capacity request acquisition section 11 a capacity payout request, and requests the capacity payout section 12 to pay out the capacity. Along with this request, the capacity request acquisition section 11 sends the following information to the capacity payout section 12.

Operation type: "payout" if a new capacity consuming entity is desired to be registered, "payback" if it is desired to be deleted, "change of the requested amount" if the attribute value of the entity is desired to be changed Capacity providing entity: the capacity providing entity searched and identified in step S4

Name of the capacity payout function: consumeFunc-Name of consumeCapacityInfo of the capacity consuming entity Requested amount/requested value: RSC/RCV specified in consumeCapacityInfo of the capacity providing entity Next, in step S6, the network management device 1 acquires by the capacity payout section 12 the capacity payout function requested by the capacity request acquisition section 11, from the function repository 23.

In step S7, the network management device 1 pays out the capacity by the capacity payout section 12 using the acquired payout function. If the capacity payout is successful (YES), the process proceeds to step S8. The payout result includes the requested amount/requested value. If the payout result of the capacity is "failure (NG)" (NO), the process is cancelled.

In step S8, based on the payout result, the network management device 1 performs by the capacity payout section 12 registration of the capacity consuming entity to which the capacity was provided, and of information of the paid-out capacity (the provided amount/value) with the capacity providing entity.

(3) Example

Next, the details of the processing according to the embodiments as described above are further described by means of examples. FIGS. 18 to 21 are diagrams showing an example thereof.

(3-1) Advance Preparation

Figure 18:
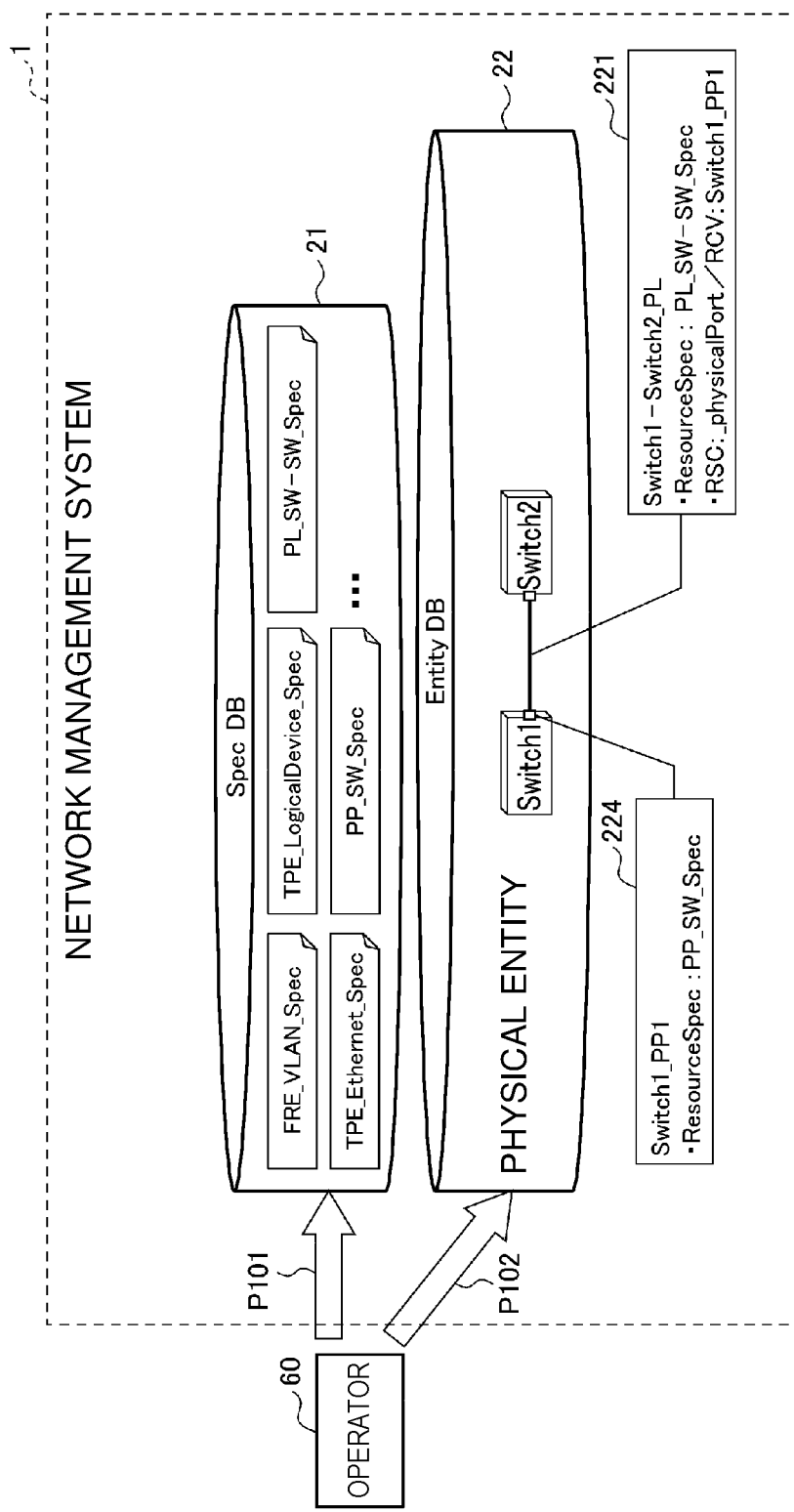
FIG. 18 is a diagram showing an example of an advance preparation procedure in the network management device shown in FIG. 1.

FIG. 18 shows the procedure of advance preparation.

In step P101, the network management device 1 receives an operation of the operator 60, and registers the specification which defines the network, with the Spec DB 21. In the example of FIG. 18, "FRE_VLAN_Spec", "TPE_LogicalDevice_Spec", "PL_SW-SW_Spec", "TPE_Ethernet_Spec", "PP_SW_Spec" . . . are registered in the Spec DB21.

In step P102, the network management device 1 also receives an operation of the operator 60, and generates an entity of the physical layer with respect to the Entity DB 22. In the example of FIG. 18, two switches (Switch1 and Switch2), an entity 221 for a connection cable between the two switches, and an entity 224 for a communication port are generated as physical entities.

(3-2) Acquisition of the Capacity Request

Figure 19:
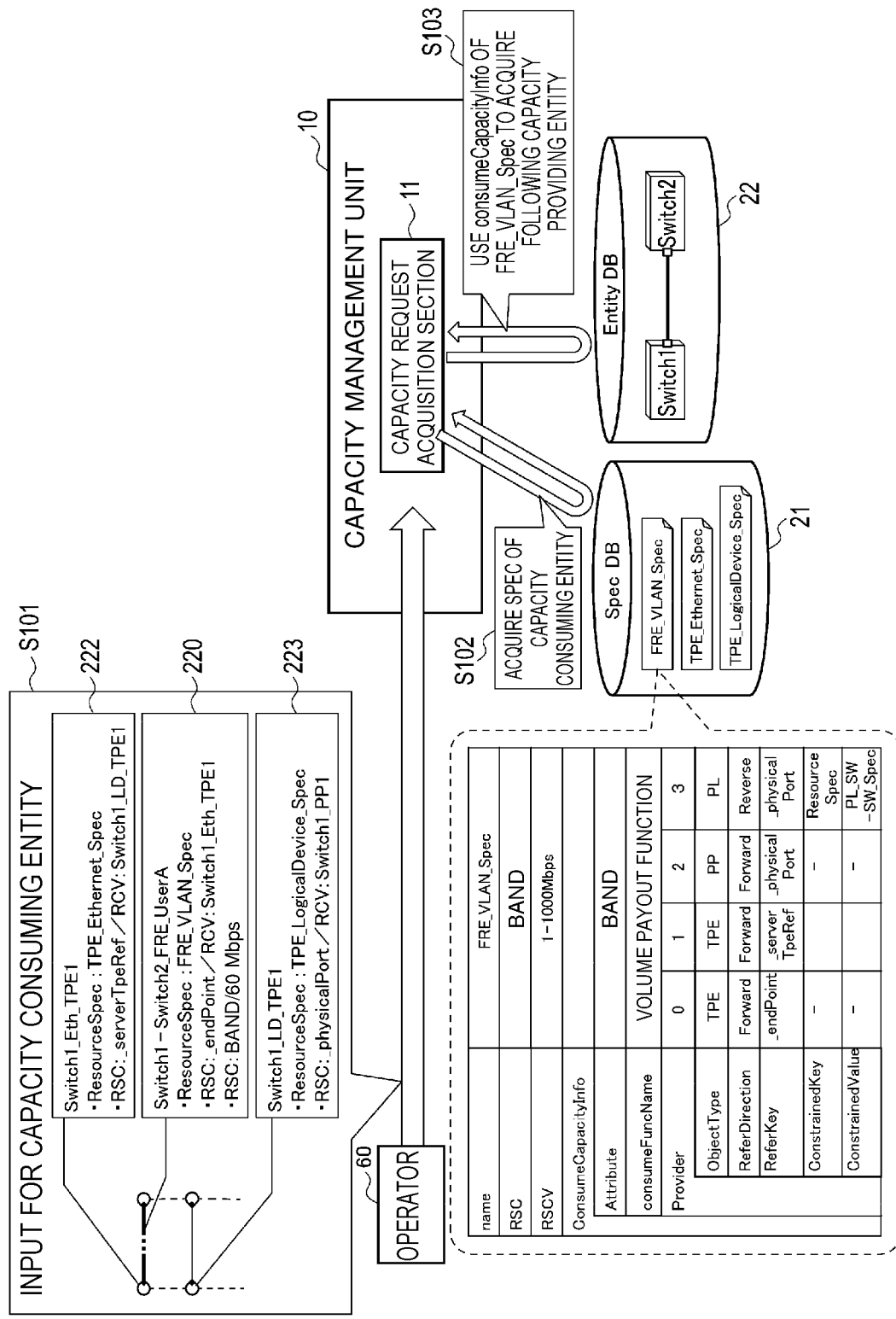
FIG. 19 is a diagram showing an example of a processing procedure by a capacity request acquisition section of the network management device shown in FIG. 1.

FIG. 19 shows a processing procedure of acquisition of the capacity request by the capacity request acquisition section 11.

First, in step S101, the network management device 1 receives by the capacity management unit 10 a generation request of the capacity consuming entity, which was input by the operator 60, and passes it to the capacity request acquisition section 11. In the example of FIG. 19, the network management device 1 receives the generation request of "Switch1-Switch2_FRE_UserA" 220. At this time, as shown in FIG. 19, it is also possible to simultaneously receive the generation requests of the entities "Switch1_Eth_TPE1" 222 and "Switch1_LD_TPE1" 223 from the operator 60. These entities 222 and 223 correspond to the entities existing in the middle of the search shown in FIG. 13, and are appropriately designed by the operator 60, for example, in response to a request from the user. Alternatively, these entities 222 and 223 may be generated and stored in the Entity DB 22 in advance. In this case, in step P102 shown as the advance preparation in FIG. 18, they are generated in the Entity DB 22 together with physical entities in response to the operation of the operator 60.

Then, in step S102, the capacity request acquisition section 11 acquires the specification (Spec) of the received capacity consuming entity from the Spec DB 21, and checks whether the specification has the capacity consumption specification (consumeCapacityInfo). In the example of FIG. 19, the specification "FRE_VLAN_Spec" defined in the "ResourceSpec" of the capacity consuming entity 220 is acquired from the Spec DB 21. The details of "FRE_VLAN_Spec" shown by the broken line in FIG. 19 are the same data examples as 211 shown in FIG. 13, and have consumeCapacityInfo. As described above, when it is determined that the FRE_VLAN_Spec acquired in step S102 has consumeCapacityInfo, the capacity request acquisition section 11 proceeds to step S103.

In step S103, the capacity request acquisition section 11 uses consumeCapacityInfo of FRE_VLAN_Spec to access the Entity DB 22, search for the reference relationship between the entities, and identify and acquire the capacity providing entity as shown in the entity DB 22 of FIG. 19. The capacity request acquisition section 11 further generates a capacity payout request based on consumeCapacityInfo.

(3-3) Receipt of the Payout Request and Acquisition of the Payout Function

Figure 20:
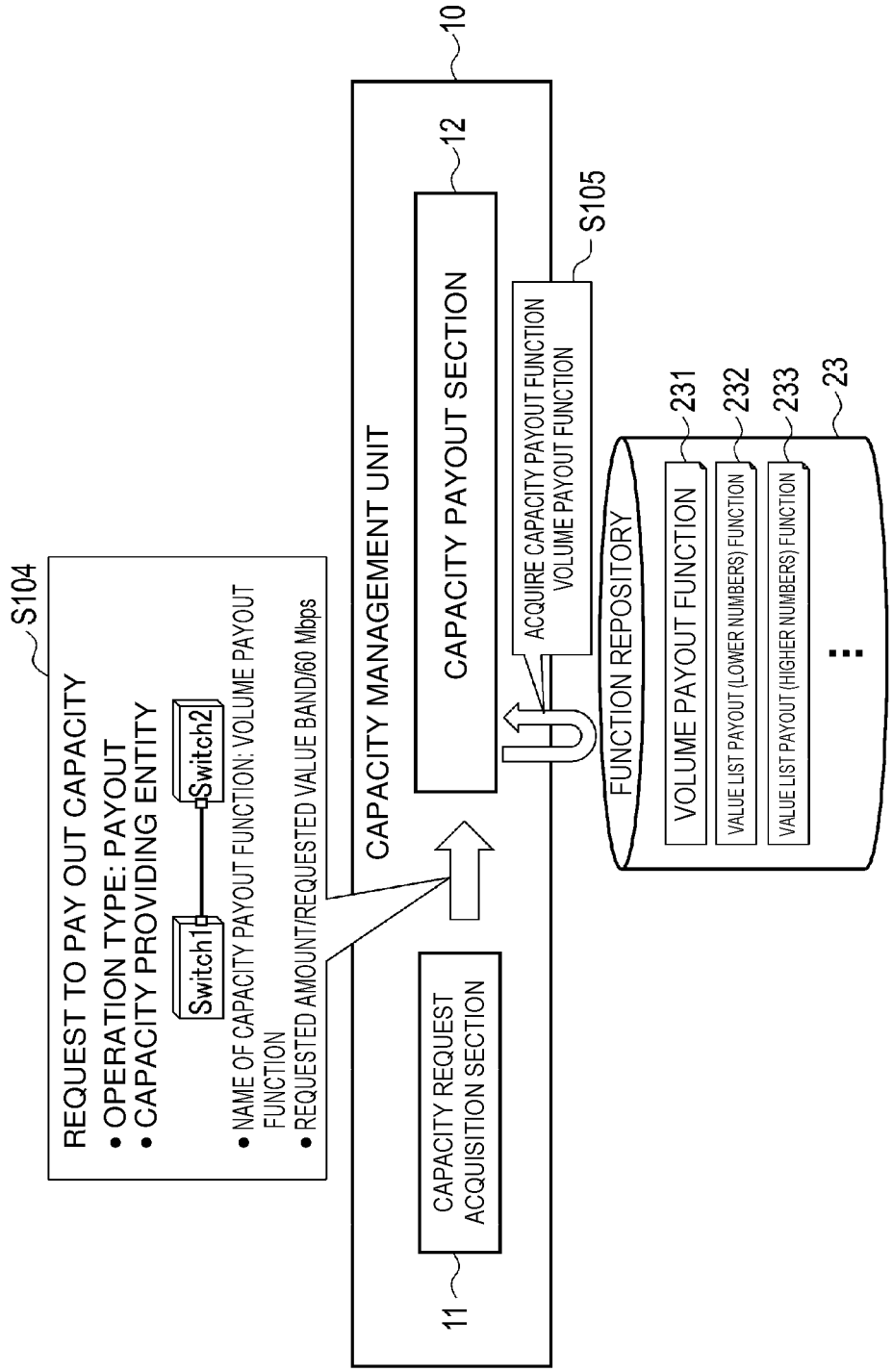
FIG. 20 is a diagram showing an example of a processing procedure up to acquisition of a payout function by a capacity payout section of the network management device shown in FIG. 1.

FIG. 20 shows a processing procedure up to receipt of the payout request and acquisition of the payout function by the capacity payout section 12.

In step S104, the capacity request acquisition section 11 passes the capacity payout request generated based on consumeCapacityInfo to the capacity payout section 12. The capacity payout request includes the following information in this example.

Operation type: payout

Capacity providing entity: Switch1-Switch2_PL

Name of the capacity payout function: volume payout function

Requested amount/requested value: band/60 Mbps

Then, in step S105, the capacity payout section 12 acquires the function with the designated capacity payout name from the function repository 23 based on the received payout request. In this example, the capacity payout section 12 acquires the volume payout function 231.

(3-4) Capacity Payout and Registration

Figure 21:
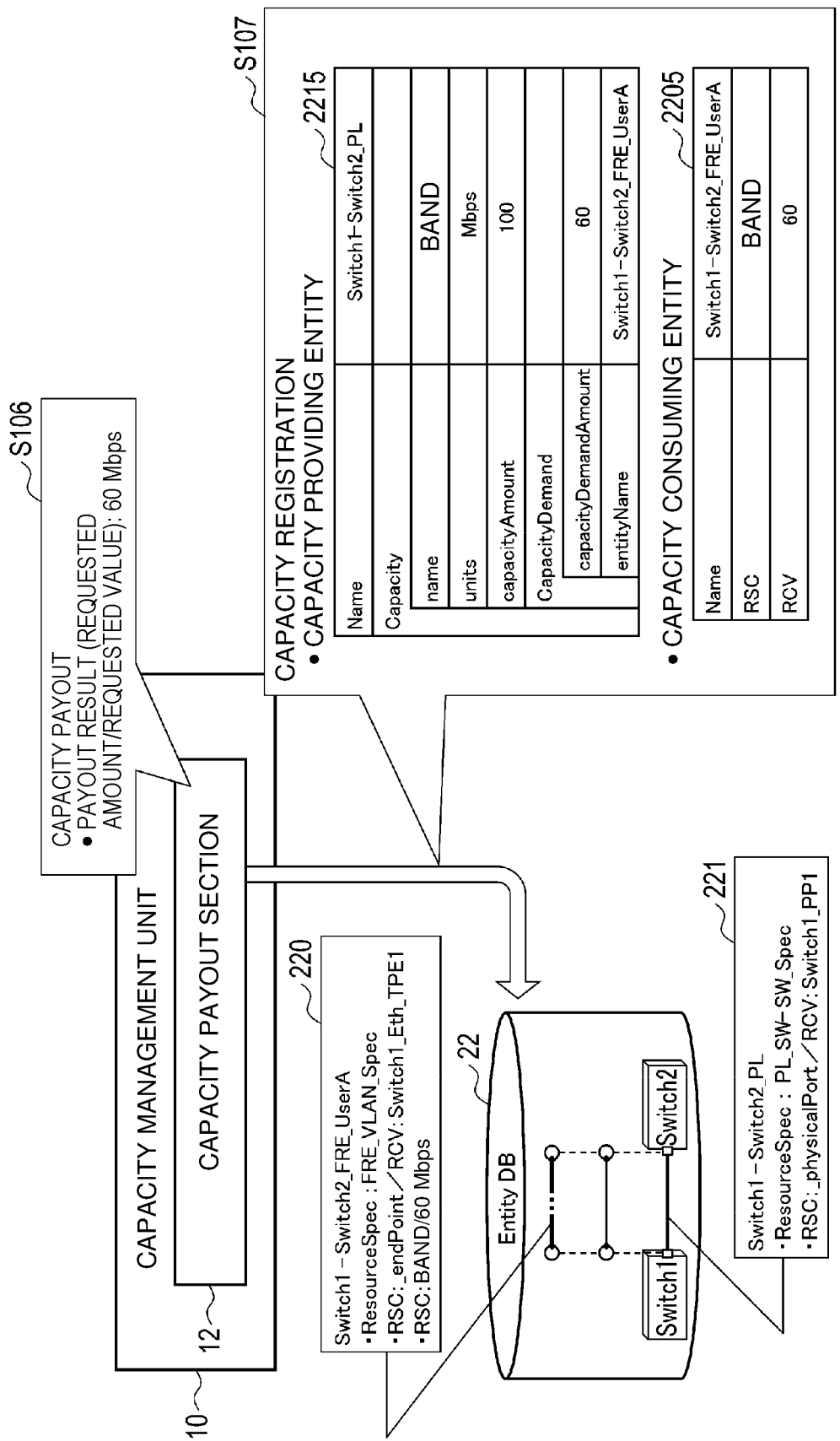
FIG. 21 is a diagram showing an example of a processing procedure up to registration by the capacity payout section of the network management device shown in FIG. 1.

FIG. 21 shows a processing procedure up to capacity payout and registration by the capacity payout section 12.

In step S106, the capacity payout section 12 pays out the capacity by using the acquired volume payout function 231. If the payout result is NG, the process is cancelled. The payout result is obtained as a requested amount/requested value, and in this example, the capacity payout section 12 pays out a band of 60 Mbps.

In step S107, the capacity payout section 12 performs registration with the Entity DB 22 based on the payout result (requested amount/requested value). In this example, the capacity payout section 12 performs registration of the capacity consuming entity (2205) and registration of the paid-out capacity with the capacity providing entity (2215).

(4) Effect

As described in detail above, in an embodiment of the present invention, there is provided the network management device 1 including the capacity management unit 10 and the management information DB 20. The management information DB 20 includes the Spec DB 21 as a first storage unit and the Entity DB 22 as a second storage unit. The first storage unit 21 stores specification information indicative of specifications of a plurality of entities included in the network 150 to be managed. The second storage unit 22 stores entity information including information indicative of relationships between the plurality of entities. The capacity management unit 10 includes a capacity request acquisition section 11. The capacity request acquisition section 11 receives an entity generation request for requesting generation of a first entity (for example, the capacity consuming entity 220) with respect to the network 150, reads the specification information about the first entity from the first storage unit 21, and determines whether or not the first entity has a consumption specification attribute indicating that a resource in the network 150 needs to be consumed. The capacity request acquisition section 11 is configured to, when it is determined that the first entity has the consumption specification attribute, identify a second entity (for example, the capacity providing entity 221) capable of providing capacity of a resource consumed by the first entity, based on the entity information stored in the second storage unit 22, and output information about the identified second entity.

As such, in the network management device 1, the capacity of the resource in the network 150 is automatically managed together with the information of the entity which consumes the resource and the entity which can provide the resource, without requiring the determination by a human operator. Therefore, in the network management system, the management of the resource is automatically performed, and the operator's work can be reduced.

Moreover, in the above-mentioned embodiment, the capacity management unit 10 further includes the capacity payout section 12. The capacity payout section 12 determines whether or not the capacity of the resource consumed by the first entity can be paid out, based on the information about the identified second entity. When it is determined that the payout is possible, the capacity payout section 12 can be configured to pay out the capacity to the first entity, and update the entity information stored in the second storage unit, using information indicating a result of the payout.

As such, in the network management device 1, up to the payout of the capacity of the resource is automatically performed, and further, the entity information is updated using the payout result. Therefore, in the network management system, resource management can be continuously performed based on the latest entity information which is updated as needed, and also, the operator's work can be reduced.

Moreover, in the above-mentioned embodiment, the updating the entity information stored in the second storage unit may include updating the entity information using, as information indicating the result of the payout, information including information for identifying the first entity which is a payout destination, and information indicative of the resource paid out to the first entity or the capacity of the resource, that is, the requested amount or requested value which was paid out.

As such, in the network management device 1, the entity information is updated by using the information about what kind of payout is specifically performed, and appropriate resource management can be performed based on the updated detailed information.

Moreover, in the above-mentioned embodiment, the network management device 1 further includes a function repository 23 as a third storage unit for storing a payout function used to pay out the capacity of the resource, and the consumption specification attribute includes information indicative of a payout function to be used to pay out the capacity of the resource to the first entity, and the capacity payout section 12 may be configured to read the payout function from the third storage unit based on the information indicative of the payout function included in the consumption specification attribute, and pay out the capacity of the resource using the read payout function.

Thus, in the network management device 1, among the payout functions stored in advance, the payout function to be used to pay out the capacity is defined by the consumption specification attribute included in the specification information of the entity. Therefore, the network management device 1 can appropriately pay out the capacity based on the consumption specification attribute.

Moreover, in the above-mentioned embodiment, the consumption specification attribute further includes information indicative of the reference destination entity as seen from the first entity, and the request acquisition section 11 may be configured to identify the second entity based on information indicative of the reference destination entity included in the consumption specification attribute.

Thus, by appropriately designing the reference relationships between the entities in advance, the network management device 1 can automatically identify the entity which can provide the capacity to the generated capacity consuming entity.

Moreover, in the above-mentioned embodiment, the first entity is a logical layer entity which constitutes the network 150 to be managed, and the second entity is a physical layer entity which constitutes the network to be managed, and the request acquisition section 11 may be configured to receive a generation request of the logical layer entity as the entity generation request, and identify the second entity based on information indicative of a relationship between the logical layer entity and the physical layer entity, as the entity information stored in the second storage unit 22.

As such, in the network management device 1, it is possible to use the architecture based on the relationship between the logical layer entity and the physical layer entity, and manage the resource capacity appropriately and automatically.

As described above, in the prior art, the operator selects a route which satisfies the user's application with respect to the network to be managed, and generates a group of entities as shown in FIGS. 22 to 24. At this time, it is necessary for the operator to determine whether the capacity of the device or network is sufficient for the user's application.

In contrast, the network management device 1 according to the above-mentioned embodiment can automatically allocate resources which meet the user's request by including the "capacity management unit 10" which determines whether the user request can be satisfied with respect to the resource capacity in the network and pays out the necessary resources. In the above-mentioned embodiment, the operator performs a "logical entity generation instruction" based on the user's request, and the capacity management unit 10 which receives this instruction performs a capacity payout process with respect to the instructed logical entity and generates the entity. Therefore, the operator's work described in the above-mentioned procedures (Q1) to (Q4) is performed by the network management device 1. There is no need for the operator's work, in particular, the operator's determination of whether it is within the capacity of the network.

As described above, the network management device 1 according to an embodiment can manage the capacity of the device resources in the network to be managed, and automatically allocate the resources satisfying the demands of the network user, and can reduce the operator's work.

Other Embodiments

The present invention is not limited to the above-mentioned embodiment. For example, each functional unit included in the network management device 1 may be distributed and arranged over a plurality of devices, and these devices may perform processing by cooperating with each other. Moreover, each functional unit may be realized by using a circuit. The circuit may be a dedicated circuit which realizes a specific function, or may be a general-purpose circuit like a processor.

The network management device 1 can also be realized by a computer and a program, and the program can be recorded on a recording medium or provided through a network.

Moreover, the flow of each process described above is not limited to the described procedure, and the order of some steps may be changed, or some steps may be performed in parallel. Moreover, the series of processes described above need not be performed continuously in time, and each step may be performed at an arbitrary timing.

At least a part of the processing of each of the above-mentioned embodiments can be realized by using as basic hardware, for example, a processor mounted on a general-purpose computer. The program which realizes the above-mentioned processing may be provided stored in a computer-readable recording medium. The program is stored in the recording medium as a file in an installable format or a file in an executable format. The recording medium includes a magnetic disk, an optical disk (a CD-ROM, a CD-R, a DVD, etc.), a magneto-optical disk (an MO, etc.), a semiconductor memory, and the like. The recording medium may be any medium as long as it can store the program and can be read by a computer. Moreover, the program which realizes the above processing may be stored on a computer (server) connected to a network such as the Internet, and downloaded to a computer (client) via the network.

In addition, the capacity payout method and the like can be variously modified and implemented without departing from the spirit of the present invention.

In short, the present invention is not limited to the above-mentioned embodiment, and can be variously modified at the implementation stage without departing from the spirit thereof. Moreover, each embodiment may be carried out in combination as appropriate, and in that case, the combined effect can be obtained. Further, the above-mentioned embodiment includes various inventions, and various inventions can be extracted by a combination selected from a plurality of disclosed constituent requirements. For example, even if some constituent requirements are deleted from all the constituent requirements shown in the embodiment, in the case that the problem can be solved and the effect is obtained, the configuration in which the constituent requirements are deleted can be extracted as an invention.

[Additional Notes]

In addition to the claims, some or all of the above-mentioned respective embodiments may also be described as shown in the following additional notes, but the present invention is not limited to them.

[C1]

A network management device (1) including a first storage unit (21) which stores specification information indicative of specifications of a plurality of entities included in a network to be managed, a second storage unit (22) which stores entity information including information indicative of relationships between the plurality of entities, and a request acquisition section (11) which receives an entity generation request for requesting generation of a first entity with respect to the network; reads the specification information about the first entity from the first storage unit, and determines whether or not the first entity has a consumption specification attribute indicating that a resource in the network needs to be consumed; when it is determined that the first entity has the consumption specification attribute, identifies a second entity capable of providing capacity of a resource consumed by the first entity, based on the entity information stored in the second storage unit; and outputs information about the identified second entity.

[C2]

The network management device according to above-mentioned [C1], further including a capacity payout section (12) which determines whether or not the capacity of the resource consumed by the first entity can be paid out, based on the information about the identified second entity; and when it is determined that the payout is possible, pays out the capacity to the first entity, and updates the entity information stored in the second storage unit, using information indicating a result of the payout.

[C3]

A network management method performed by a network management device (1), including causing a memory to store specification information indicative of specifications of a plurality of entities included in a network to be managed, and entity information including information indicative of relationships between the plurality of entities, receiving an entity generation request for requesting generation of a first entity with respect to the network, reading the specification information about the first entity from the memory, and determining whether or not the first entity has a consumption specification attribute indicating that a resource in the network needs to be consumed, when it is determined that the first entity has the consumption specification attribute, identifying a second entity capable of providing capacity of a resource consumed by the first entity, based on the entity information stored in the memory, and outputting information about the identified second entity.

[C4]

A non-temporary computer-readable storage medium including instructions which, when executed by a hardware processor, cause the hardware processor to perform a method including causing a memory to store specification information indicative of specifications of a plurality of entities included in a network to be managed, and entity information including information indicative of relationships between the plurality of entities, receiving an entity generation request for requesting generation of a first entity with respect to the network, reading the specification information about the first entity from the memory, and determining whether or not the first entity has a consumption specification attribute indicating that a resource in the network needs to be consumed, when it is determined that the first entity has the consumption specification attribute, identifying a second entity capable of providing capacity of a resource consumed by the first entity, based on the entity information stored in the memory, and outputting information about the identified second entity.

REFERENCE SIGNS LIST

1 Network management device
10 Capacity management unit
11 Capacity request acquisition section
12 Capacity payout section
20 Management information database
21 Spec database
22 Entity database
23 Function repository
231 Volume payout function
232 Value list payout (lower numbers) function
233 Value list payout (higher numbers) function
51 CPU
52 RAM
53 Program memory
54 Auxiliary storage device
55 Communication interface
56 Input/output interface
57 Bus
60 Operator
150 Network

The invention claimed is:

1. A network management device having a hardware processor and a memory, wherein
the memory comprises
a first storage unit which stores specification information indicative of specifications of a plurality of entities included in a network to be managed, and
a second storage unit which stores entity information including information indicative of relationships between the plurality of entities, and
a third storage unit for storing a payout function used to pay out the capacity of the resource, and
the hardware processor is configured to perform
receiving an entity generation request for requesting generation of a first entity with respect to the network,
reading the specification information about the first entity from the first storage unit, and determining whether or not the first entity has a consumption specification attribute indicating that a resource in the network needs to be consumed where the consumption specification attribute includes information indicative of a payout function to be used to pay out the capacity of the resource to the first entity,
when it is determined that the first entity has the consumption specification attribute, identifying a second entity capable of providing capacity of a resource consumed by the first entity, based on the entity information stored in the second storage unit,
determining whether or not the capacity of the resource consumed by the first entity can be paid out, based on the information about the identified second entity, and when it is determined that the payout is possible, paying out the capacity to the first entity, and updating the entity information stored in the second storage unit, using information indicating a result of the payout, and
read the payout function from the third storage unit based on the information indicative of the payout function included in the consumption specification attribute, and pay out the capacity of the resource using the read payout function.

2. The network management device according to claim 1, wherein
the updating the entity information stored in the second storage unit comprises updating the entity information using, as information indicating the result of the payout, information including information for identifying the first entity which is a payout destination, and information indicative of the resource paid out to the first entity or the capacity of the resource.

3. The network management device according to claim 1, wherein the consumption specification attribute further includes information indicative of a reference destination entity as seen from the first entity, and the hardware processor is further configured to identify the second entity based on the information indicative of the reference destination entity included in the consumption specification attribute.

4. The network management device according to claim 1, wherein
the first entity is a logical layer entity which constitutes the network to be managed, and the second entity is a physical layer entity which constitutes the network to be managed,
the hardware processor is further configured to
receive a generation request of the logical layer entity as the entity generation request, and
identify the second entity based on information indicative of a relationship between the logical layer entity and the physical layer entity, as the entity information stored in the second storage.

5. A non-transitory computer-readable medium having computer-executable instructions that, upon execution of the instructions by a processor of a computer, cause the computer to function as the network management device according to claim 1.

6. A network management method performed by a network management device having a hardware processor and a memory, wherein
the hardware processor comprises
causing the memory to store specification information indicative of specifications of a plurality of entities included in a network to be managed, and entity information including information indicative of relationships between the plurality of entities, and a payout function used to pay out the capacity of the resource,
receiving an entity generation request for requesting generation of a first entity with respect to the network,
reading the specification information about the first entity from the memory, and determining whether or not the first entity has a consumption specification attribute indicating that a resource in the network needs to be consumed, where the consumption specification attribute includes information indicative of a payout function to be used to pay out the capacity of the resource to the first entity,
when it is determined that the first entity has the consumption specification attribute, identifying a second entity capable of providing capacity of a resource consumed by the first entity, based on the entity information stored in the memory,
determining whether or not the capacity of the resource consumed by the first entity can be paid out, based on the information about the identified second entity, and when it is determined that the payout is possible, paying out the capacity to the first entity, and updating the entity information stored in the second storage unit, using information indicating a result of the payout, and reading the payout function from the third storage unit based on the information indicative of the payout function included in the consumption specification attribute, and paying out the capacity of the resource using the read payout function.

\* \* \* \* \*